US012236873B2

(12) United States Patent
Kim et al.

(10) Patent No.: US 12,236,873 B2
(45) Date of Patent: Feb. 25, 2025

(54) DISPLAY DEVICE

(71) Applicant: Samsung Display Co., LTD., Yongin-si (KR)

(72) Inventors: Kang-Min Kim, Yongin-si (KR); Dongin Kim, Yongin-si (KR); Byoungchel Kim, Yongin-si (KR); Jahun Koo, Yongin-si (KR); Yeong Won Kim, Yongin-si (KR); Bongim Park, Yongin-si (KR); Gyusu Lee, Yongin-si (KR); Hye Ryeon Jo, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 10 days.

(21) Appl. No.: 18/238,463

(22) Filed: Aug. 26, 2023

(65) Prior Publication Data

US 2024/0153453 A1 May 9, 2024

(30) Foreign Application Priority Data

Nov. 7, 2022 (KR) ........................ 10-2022-0147147

(51) Int. Cl.
*G09G 3/3233* (2016.01)
*G09G 3/32* (2016.01)
*G09G 3/3275* (2016.01)

(52) U.S. Cl.
CPC ............. *G09G 3/3233* (2013.01); *G09G 3/32* (2013.01); *G09G 3/3275* (2013.01); (Continued)

(58) Field of Classification Search
CPC ...... G09G 3/3233; G09G 3/32; G09G 3/3275; G09G 2300/0452; G09G 2310/0275; G09G 2320/0233
See application file for complete search history.

(56) References Cited

U.S. PATENT DOCUMENTS 6,847,172 B2 1/2005 Suzuki
8,749,598 B2 6/2014 Taro et al.
(Continued)

FOREIGN PATENT DOCUMENTS

KR 101065419 B1 9/2011
KR 101374477 B1 3/2014

OTHER PUBLICATIONS

Shin et al., Enhancement of the Luminance Uniformity in Large-Size Organic Light-Emitting Devices Based on In—Ga—Zn—O Thin-Film Transistors by Using a New Compensation Method, IEEE Journal of the Electron Devices Society, vol. 7, 2019, pp. 557-560.

*Primary Examiner* — Stacy Khoo
(74) *Attorney, Agent, or Firm* — CANTOR COLBURN LLP

(57) ABSTRACT

A display device includes a display panel which includes a pixel including a driving transistor and a light-emitting element, and a sensing line connected to the pixel. A sensing driver senses a first sensing signal corresponding to mobility of the driving transistor through the sensing line, and processes the first sensing signal to output first sensing data. A driving controller receives the first sensing data from the sensing driver, generates mobility compensation data and kickback compensation data based on the first sensing data, and converts image data into compensation image data by the mobility compensation data and the kickback compensation data. A data driver converts the compensation image data into a data signal and provides the data signal to the pixel.

26 Claims, 16 Drawing Sheets

(52) U.S. Cl.
CPC ............... *G09G 2300/0452* (2013.01); *G09G 2310/0275* (2013.01); *G09G 2320/0233* (2013.01)

(56) References Cited

U.S. PATENT DOCUMENTS

| | | | | |
|---|---|---|---|---|
| 2011/0122119 | A1* | 5/2011 | Bae ...................... | G09G 3/3233<br>345/211 |
| 2011/0210958 | A1 | 9/2011 | Yoo et al. | |
| 2021/0202673 | A1* | 7/2021 | Kim ..................... | G09G 3/3233 |

* cited by examiner

DISPLAY DEVICE

This application claims priority to Korean Patent Application No. 10-2022-0147147, filed on Nov. 7, 2022, and all the benefits accruing therefrom under 35 U.S.C. § 119, the content of which in its entirety is herein incorporated by reference.

BACKGROUND

1. Field

The disclosure herein relates to a display device, and more particularly, to a display device having improved luminance properties.

2. Description of the Related Art

Among display devices, a light-emitting type display device displays images using a light-emitting diode which generates light by recombination of electrons and holes. Such a light-emitting type display device has advantages of having fast response speed and being driven with low power consumption.

A light-emitting type display device is provided with pixels connected to data lines and scan lines. The pixels usually include a light-emitting element, and a pixel circuit unit for controlling an amount of current flowing into the light-emitting element. The pixel circuit unit controls an amount of current flowing from a first driving voltage to a second driving voltage via the light-emitting element in correspondence to a data signal. At this time, in correspondence to an amount of current flowing through the light-emitting element, light with a predetermined luminance is generated.

SUMMARY

The disclosure provides a display device capable of improving luminance uniformity by compensating for a deviation of a kickback voltage.

An embodiment of the inventive concept provides a display device including a display panel, a sensing driver, a driving controller, and a data driver. The display panel includes a pixel including a driving transistor and a light-emitting element, and a sensing line connected to the pixel. The sensing driver senses a first sensing signal corresponding to mobility of the driving transistor through the sensing line during a sensing period, and processes the first sensing signal to output first sensing data. The driving controller receives the first sensing data from the sensing driver, generates mobility compensation data and kickback compensation data based on the first sensing data, and converts image data into compensation image data by the mobility compensation data and the kickback compensation data. The data driver converts the compensation image data into a data signal and provide the data signal to the pixel.

In an embodiment of the inventive concept, a display device includes a display panel, a sensing driver, a driving controller, and a data driver. The display panel includes a pixel cell and at least one sensing line connected to the pixel cell. The pixel cell includes a first pixel, a second pixel, and a third pixel. The sensing driver is connected to the at least one sensing line, receives a first pixel sensing signal for the first pixel, a second pixel sensing signal for the second pixel, and a third pixel sensing signal for the third pixel, and processes the first to third pixel sensing signals to output first, second, and third pixel sensing data. The driving controller receives the first, second, and third pixel sensing data from the sensing driver, generates kickback compensation data by a difference among the first, second, and third pixel sensing data, and converts image data into compensation image data based on the kickback compensation data. The data driver converts the compensation image data into a data signal and provide the data signal to the display panel.

BRIEF DESCRIPTION OF THE DRAWINGS

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

Figure 1:
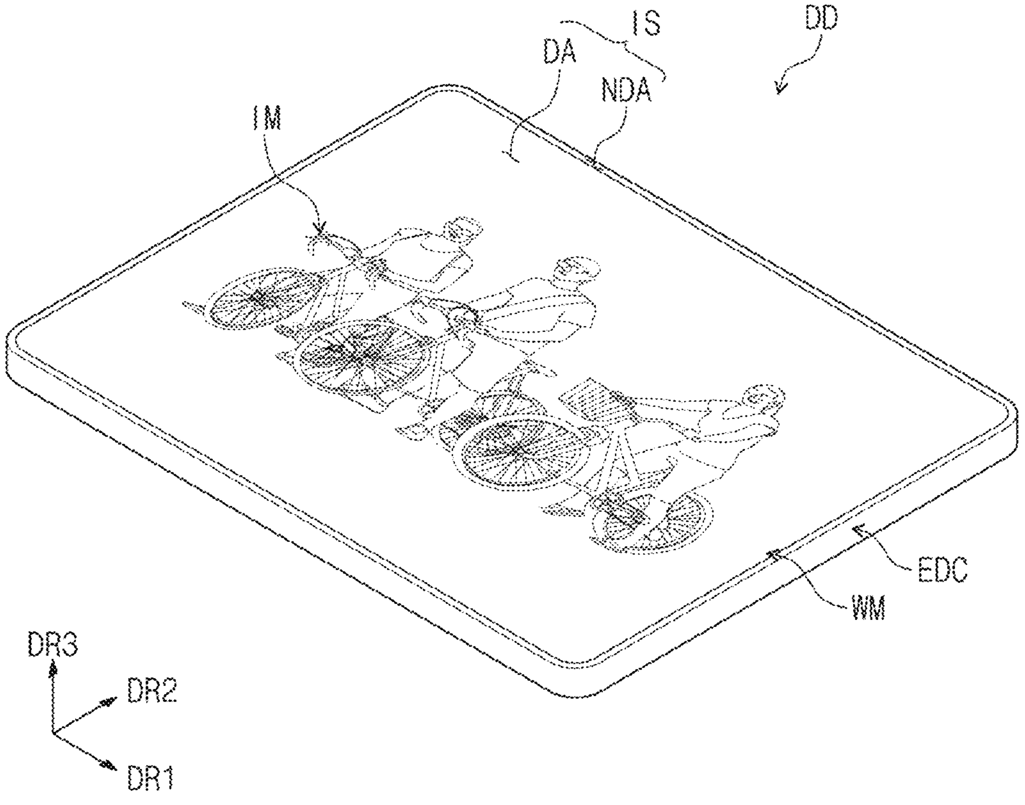
FIG. 1 is a perspective view of an embodiment of a display device according to the inventive concept.

In the disclosure, when an element (or a region, a layer, a portion, etc.) is referred to as being "on," "connected to," or "coupled to" another element, it means that the element may be directly disposed on/connected to/coupled to the other element, or that a third element may be disposed therebetween.

Like reference numerals refer to like elements. Also, in the drawings, the thickness, the ratio, and the dimensions of elements are exaggerated for an effective description of technical contents. The term "and/or," includes all combinations of one or more of which associated components may define.

It will be understood that, although the terms "first," "second," etc. may be used herein to describe various elements, these elements should not be limited by these terms. These terms are only used to distinguish one element from another. For example, a first element may be referred to as a second element, and a second element may also be referred to as a first element in a similar manner without departing the scope of rights of the invention. The terms of a singular form may include plural forms unless the context clearly indicates otherwise.

In addition, terms such as "below," "lower," "above," "upper," and the like are used to describe the relationship of the components shown in the drawings. The terms are used as a relative concept and are described with reference to the direction indicated in the drawings.

It should be understood that the term "comprise," or "have" is intended to specify the presence of stated features, integers, steps, operations, elements, components, or combinations thereof in the disclosure, but do not preclude the presence or addition of one or more other features, integers, steps, operations, elements, components, or combinations thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term "about" can mean within one or more standard deviations, or within ±30%, 20%, 10%, 5% of the stated value, for example.

The term "block" or "unit" as used herein is intended to mean a software component or a hardware component that performs a predetermined function. The hardware component may include a field-programmable gate array ("FPGA") or an application-specific integrated circuit ("ASIC"), for example. The software component may refer to an executable code and/or data used by the executable code in an addressable storage medium. Thus, the software components may be object-oriented software components, class components, and task components, and may include processes, functions, attributes, procedures, subroutines, segments of program code, drivers, firmware, micro codes, circuits, data, a database, data structures, tables, arrays, or variables, for example.

Unless otherwise defined, all terms (including technical and scientific terms) used herein have the same meaning as commonly understood by one of ordinary skill in the art to which the invention pertains. It is also to be understood that terms such as terms defined in commonly used dictionaries should be interpreted as having meanings consistent with the meanings in the context of the related art, and should not be interpreted in too ideal a sense or an overly formal sense unless explicitly defined herein.

Hereinafter, embodiments of the inventive concept will be described with reference to the accompanying drawings.

Figure 2:
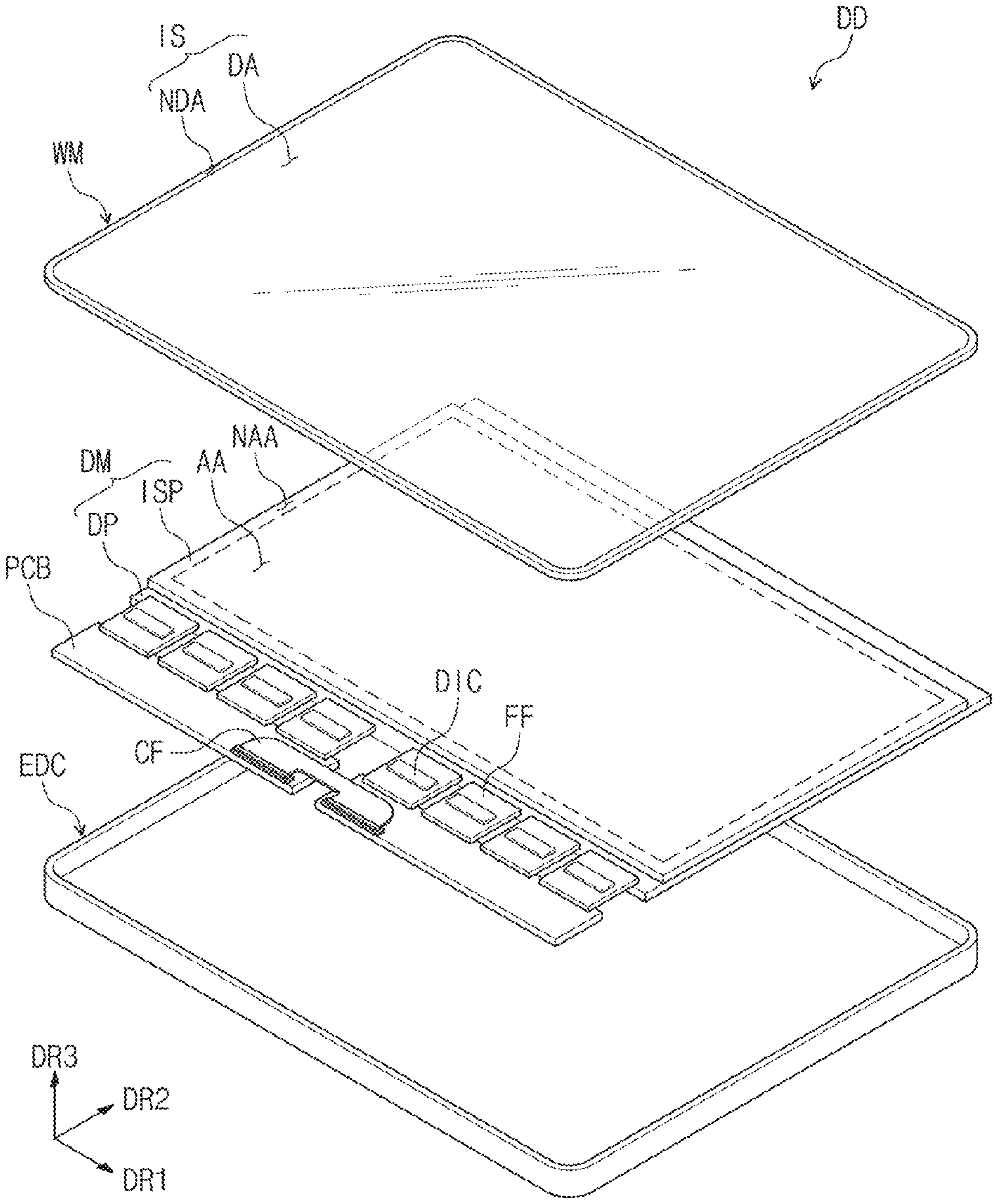
FIG. 2 is an exploded perspective view of an embodiment of a display device according to the inventive concept.

FIG. 1 is a perspective view of an embodiment of a display device in an embodiment of the inventive concept, and FIG. 2 is an exploded perspective view of an embodiment of a display device according to the inventive concept.

Referring to FIG. 1 and FIG. 2, the display device DD may be a device activated by an electrical signal. The display device DD according to the inventive concept may be a large-sized display device such as a television and a monitor, and may be a small-and-medium-sized display device such as a mobile phone, a tablet, a laptop computer, a car navigation system unit, and a game console. It should be understood that these are merely illustrative embodiments, and the display device DD may be implemented in other forms without departing from the concept of the invention. The display device DD has a quadrangular shape, e.g., rectangular shape which includes long sides in a first direction DR1 and short sides in a second direction DR2 which crosses the first direction DR1. However, the shape of the display device DD is not limited thereto. The display device DD of various shapes may be provided. The display device DD may display an image IM toward a third direction DR3 on a display surface IS parallel to each of the first direction DR1 and the second direction DR2. The display surface IS on which the image IM is displayed may correspond to the front surface of display device DD.

In the illustrated embodiment, a front surface (or an upper surface) and a rear surface (or a lower surface) of each member are defined on the basis of a direction in which the image IM is displayed. The front surface and the rear surface oppose each other in the third direction DR3 and the normal direction of each of the front surface and the rear surface may be parallel to the third direction DR3.

The separation distance between the front surface and the back surface in the third direction DR3 may correspond to the thickness of the display device DD in the third direction DR3. Directions indicated by the first to third directions DR1, DR2, and DR3 are a relative concept, and may be converted to different directions.

The display device DD may sense an external input applied from the outside. The external input may include various forms of inputs provided from the outside of the display device DD. The display device DD in an embodiment of the inventive concept may sense a user's external input applied from the outside. The user's external input may be any one or a combination of various forms of external inputs such as a part of a user's body, light, heat, gaze, pressure, or the like. In addition, depending on the structure of the display device DD, the display device DD may sense a user's external input applied to a side surface or a rear surface of the display device DD, and is not limited to any particular embodiment. In an embodiment of the inventive concept, the external input may include inputs by an input device (e.g., a stylus pen, an active pen, a touch pen, an electronic pen, an e-pen, etc.), or the like.

The display surface IS of the display device DD may include a display region DA and a non-display region NDA. The display region DA may be a region in which the image IM is displayed. A user visually recognizes the image IM through the display region DA. In the illustrated embodiment, the display region DA is illustrated as a quadrangular shape having rounded vertices. However, this is only illustrative. The display region DA may have various shapes, and is not limited to any particular embodiment.

The non-display region NDA is adjacent to the display region DA. The non-display region NDA may have a predetermined color. The non-display region NDA may surround the display region DA. Accordingly, the shape of the display region DA may be substantially defined by the non-display region NDA. However, this is only illustrative. The non-display region NDA may be disposed adjacent to only one side of the display region DA, or may be omitted. The display device DD in an embodiment of the inventive concept may include various embodiments, and is not limited to any particular embodiment.

As illustrated in FIG. 2, the display device DD may include the display module DM, and a window WM disposed on the display module DM. The display module DM may include a display panel DP and an input sensing layer ISP.

The display panel DP in an embodiment of the inventive concept may be a light-emitting-type display panel. As an example thereof, the display panel DP may be an organic light-emitting display panel, an inorganic light-emitting display panel, or a quantum dot light-emitting display panel. A light-emitting layer of the organic light-emitting display panel may include an organic light-emitting material. A light-emitting layer of the inorganic light-emitting display panel may include an inorganic light-emitting material. A light-emitting layer of a quantum dot light-emitting display panel may include a quantum dot, a quantum load, or the like.

The display panel DP outputs the image IM, and the output image IM may be displayed through the display surface IS.

The input sensing layer ISP may be disposed on the display panel DP to sense an external input. The input sensing layer ISP may be disposed directly on the display panel DP. In an embodiment of the inventive concept, the input sensing layer ISP may be formed on the display panel DP by a continuous process. That is, when the input sensing layer ISP is directly disposed on the display panel DP, an inner adhesive film (not shown) is not disposed between the input sensing layer ISP and the display panel DP. However, the inner adhesive film may be disposed between the input sensing layer ISP and the display panel DP. In this case, the input sensing layer ISP is not manufactured in a continuous process with the display panel DP, but may be manufactured through a process separate from that of the display panel DP, and then fixed on an upper surface of the display panel DP using the inner adhesive film.

The window WM may include or consist of a transparent material capable of emitting the image IM. In an embodiment, the window WM may consist of glass, sapphire, plastic, or the like, for example. The window WM is illustrated as being a single layer, but the inventive concept is not limited thereto. The window WM may include a plurality of layers.

Although not illustrated, the non-display region NDA of the display device DD described above may be substantially provided as a region in which a material including a predetermined color is printed in one region of the window WM. In an embodiment of the inventive concept, the window WM may include a light-blocking pattern for defining the non-display region NDA. The light-blocking pattern is a colored organic film, and may be formed in a coating manner, for example.

The window WM may be coupled to the display module DM through an adhesive film. In an embodiment of the inventive concept, the adhesive film may include an optically clear adhesive ("OCA") film. However, the adhesive film is not limited thereto, and may include a typical adhesive or a typical pressure-sensitive adhesive. In an embodiment, the adhesive film may include an optically clear resin ("OCR") or a pressure sensitive adhesive film ("PSA"), for example.

Between the window WM and the display module DM, a reflection prevention layer may further be disposed. The reflection prevention layer reduces the reflectance of an external light incident from an upper side of the window WM. The refection prevention layer in an embodiment of the inventive concept may include a phase retarder and a polarizer. The phase retarder may be of a film type or a liquid crystal coating type, and may include a 212 phase retarder and/or a 214 phase retarder. However, the disclosure is not limited thereto, and the phase retarder may include various other phase retarders. The polarizer may also be of a film type or a liquid crystal coating type. The film type polarizer may include a stretchable synthetic resin film, and the liquid crystal coating type polarizer may include liquid crystals arranged in a predetermined arrangement. The phase retarder and the polarizer may be implemented as a single polarizing film.

In an embodiment of the inventive concept, the reflection prevention layer may include color filters. The arrangement of the color filters may be determined in consideration of colors of light generated by a plurality of pixels PX (refer to FIG. 3A) included in the display panel DP. In this case, the reflection prevention layer may further include a light-blocking pattern disposed between the color filters.

The display module DM displays the image IM according to an electrical signal, and may transmit/receive information on an external input. The display module DM may be defined as an active region AA and a non-active region NAA. The active region AA may be defined as a region (i.e., a region in which the image IM is displayed) in which the image IM is emitted from the display panel DP. In addition, the active region AA may be defined as a region in which the input sensing layer ISP senses an external input applied from the outside. In an embodiment, the active region AA of the display module DM may correspond to (or overlap) at least a portion of the display region DA.

The non-active region NAA is adjacent to the active region AA. The non-active region NAA may be substantially a region in which the image IM is not displayed. In an embodiment, the non-active region NAA may surround the active region AA, for example. However, this is only one of embodiments. The non-active region NAA may be defined as various shapes, and is not limited to any particular embodiment. In an embodiment, the non-active region NAA of the display module DM may correspond to (or overlap) at least a portion of the non-display region NDA.

The display device DD may further include a plurality of flexible films FF connected to the display panel DP. A driving chip DIC may be disposed (e.g., mounted) on each of the flexible films FF. In an embodiment of the inventive concept, a source driver 200 (refer to FIG. 3A) consists of a plurality of driving chips DIC, and the plurality of driving chips DIC may be disposed (e.g., mounted) on the plurality of flexible films FF, respectively.

The display device DD may further include at least one circuit board PCB coupled to the plurality of flexible films FF. In an embodiment of the inventive concept, two circuit boards PCB are provided to the display device DD, but the number of circuit boards PCB is not limited thereto. Two adjacent circuit boards among the circuit boards PCB may be electrically connected to each other by a connection film CF. In addition, at least one of the circuit boards PCB may be electrically connected to a main board. On at least one of the circuit boards PCB, a driving controller 100 (refer to FIG. 3A), a voltage generator 300 (refer to FIG. 3A), or the like may be disposed.

FIG. 2 illustrates a structure in which the driving chips DIC are respectively disposed (e.g., mounted) on the flexible films FF, but the inventive concept is not limited thereto. In an embodiment, the driving chips DIC may be directly disposed on the display panel DP, for example. In this case, a portion of the display panel DP in which the driving chip DIC is disposed (e.g., mounted) may be bent and disposed on a back surface of the display module DM.

The input sensing layer ISP may be electrically connected to the circuit board PCB through the flexible films FF. However, the inventive concept is not limited thereto. That is, the display module DM may additionally include a separate flexible film for electrically connecting the input sensing layer ISP to the circuit board PCB.

The display device DD further includes a housing EDC which receives the display module DM. The housing EDC may be coupled to the window WM and define the appearance of the display device DD. The housing EDC absorbs impacts applied from the outside and prevents foreign materials/moisture or the like from penetrating into the display module DM to protect components received in the housing EDC. In an embodiment of the inventive concept, the housing EDC may be provided in a form in which a plurality of receiving members is coupled to each other.

The display device DD in an embodiment may further include an electronic module having various functional modules for operating the display module DM, a power supply module (e.g., a battery) for supplying power desired for the overall operation of the display device DD, a bracket coupled to the display module DM and/or the housing EDC to divide the internal space of display device DD, or the like.

Figure 3A:
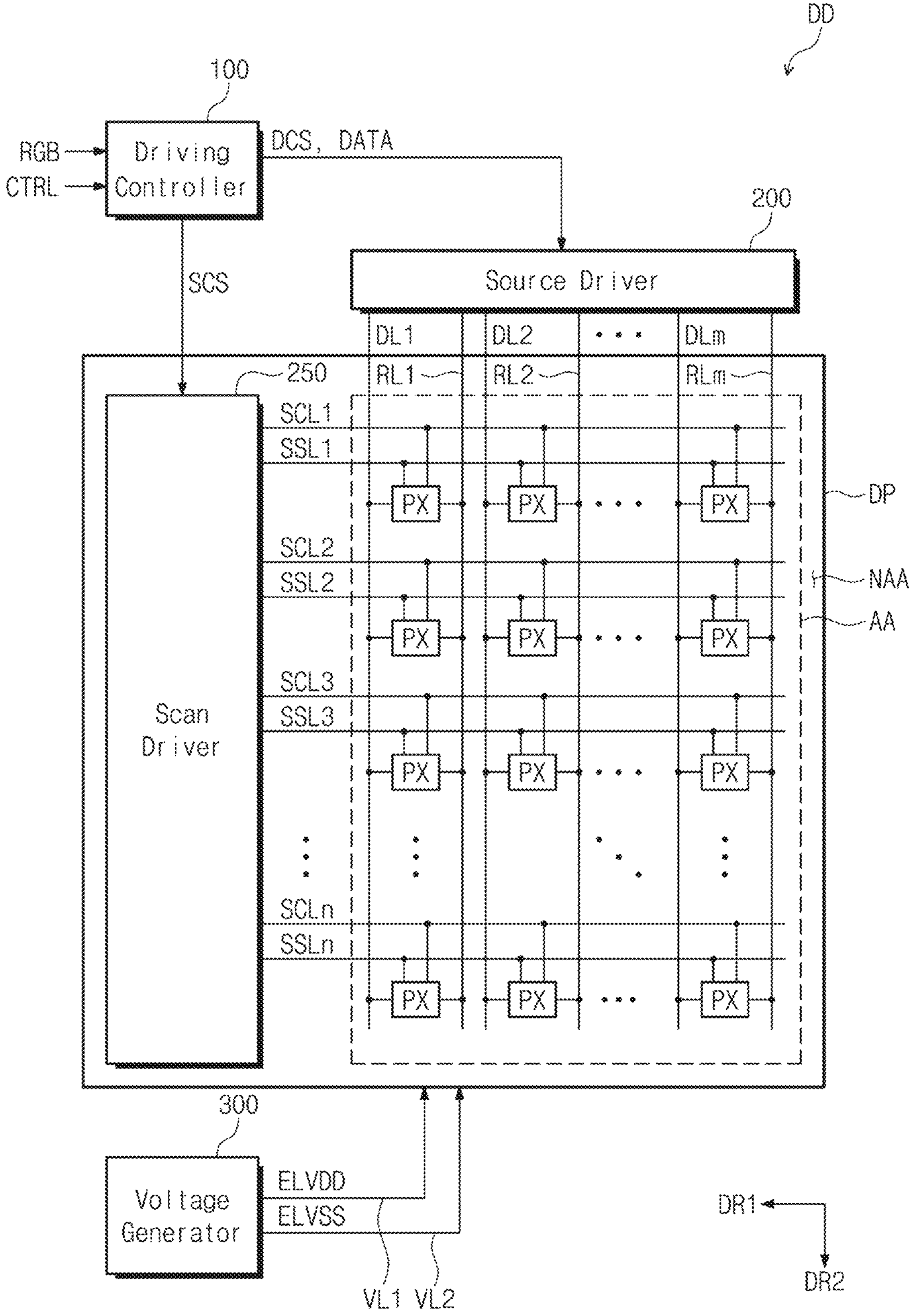
FIG. 3A is a block diagram of an embodiment of a display device according to the inventive concept.
Figure 3B:
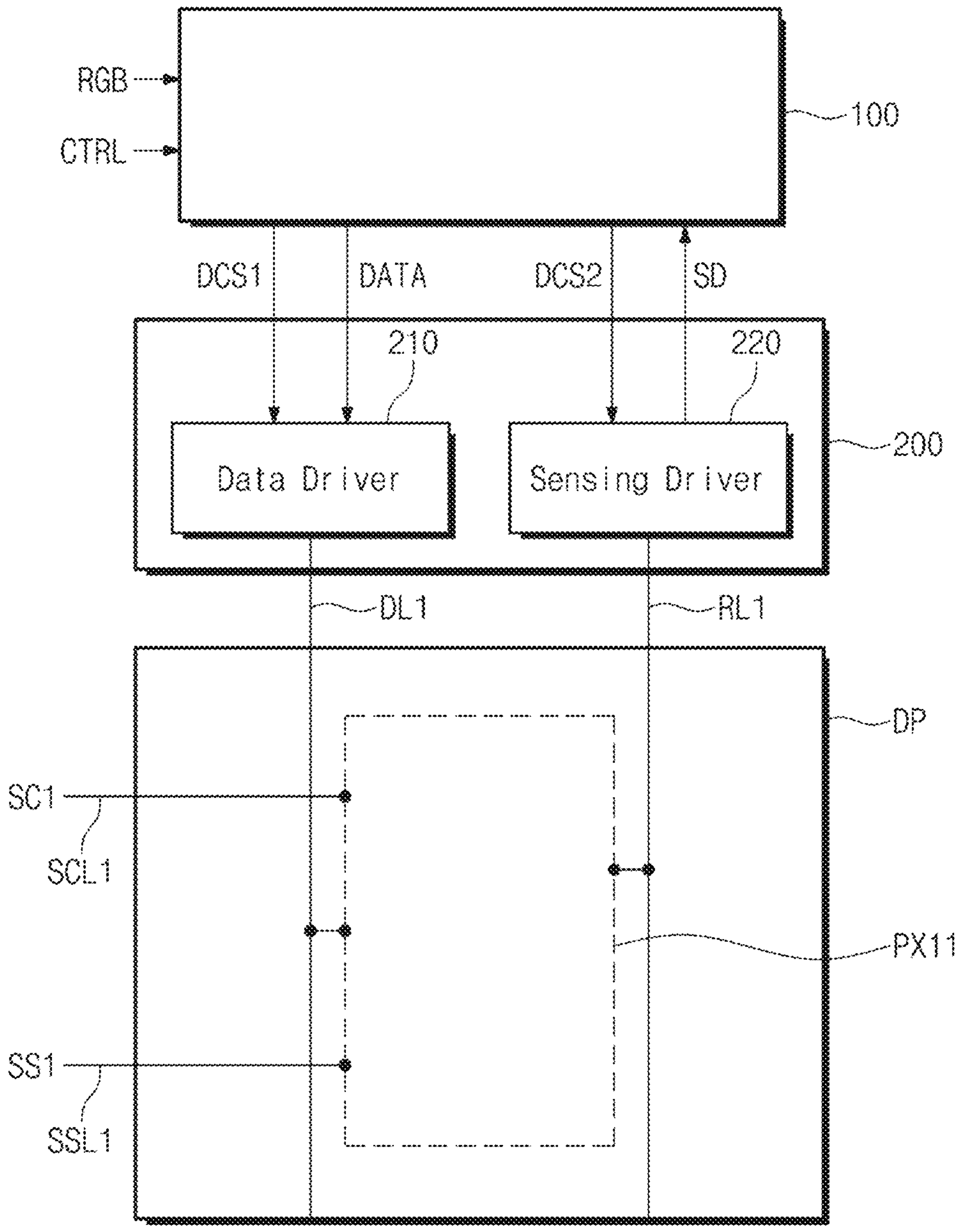
FIG. 3B is a block diagram showing a driving controller and a source driver illustrated in FIG. 3A.

FIG. 3A is a block diagram of an embodiment of a display device in an embodiment of the inventive concept, and FIG. 3B is a block diagram showing a driving controller and a source driver illustrated in FIG. 3A.

Referring to FIG. 3A and FIG. 3B, the display device DD includes the driving controller 100, the source driver 200, a scan driver 250, the voltage generator 300, and the display panel DP. In an embodiment of the inventive concept, the source driver 200 may include a data driver 210 and a sensing driver 220.

The display panel DP includes driving scan lines SCL1 to SCLn, sensing scan lines SSL1 to SSLn, data lines DL1 to DLm, a plurality of sensing lines RL1 to RLm, and the pixels PX. Here, n and m are natural numbers. The display panel DP may be divided into the active region AA and the non-active region NAA. The pixels PX may be disposed in the active region AA, and the scan driver 250 may be disposed in the non-active region NAA.

The driving scan lines SCL1 to SCLn and the sensing scan lines SSL1 to SSLn are extended parallel to the first direction DR1, and arranged spaced apart from each other in the second direction DR2. The second direction DR2 may be a direction intersecting to the first direction DR1. The data lines DL1 to DLm are extended parallel to the second direction DR2 from the source driver 200, and arranged spaced apart from each other in the first direction DR1. The sensing lines RL1 to RLm are extended in the second direction DR2, and may be arranged in the first direction DR1.

The plurality of pixels PX is electrically connected to the driving scan lines SCL1 to SCLn, the sensing scan lines SSL1 to SSLn, the data lines DL1 to DLm, and the sensing lines RL1 to RLm, respectively. Each of the plurality of pixels PX may be electrically connected to two scan lines. In an embodiment, as illustrated in FIG. 3B, a first pixel PX11 among the plurality of pixels PX may be connected to a first driving scan line SCL1, a first sensing scan line SSL1, a first data line DL1, and a first sensing line RL1, for example. However, the number of scan lines connected to each pixel is not limited thereto. In an embodiment, each pixel may be electrically connected one or three scan lines, for example.

Each of the plurality of pixels PX includes a light-emitting element ED (refer to FIG. 4) and a pixel circuit unit PXC (refer to FIG. 4) which controls the light emission of the light-emitting element ED. The pixel circuit unit PXC may include a plurality of transistors and a capacitor.

The driving controller 100 receives an input image signal RGB and a control signal CTRL from a main controller (e.g., a microcontroller). The driving controller 100 may generate image data DATA by converting the data format of the input image signal RGB to meet the interface specifications of the source driver 200. The driving controller 100 may receive the input image signal RGB in units of frames. The image data DATA may be referred to differently according to a corresponding frame. That is, image data converted from the input image signal RGB received during the previous frame may be also referred to as previous image data, and image data converted from the input image signal RGB received during the current frame may be also referred to as current image data.

The driving controller 100 generates a scan control signal SCS and a source control signal DCS based on the control signal CTRL. The source control signal DCS may include a data control signal DCS1 for controlling the driving of the data driver 210 and a sensing control signal DCS2 for controlling the driving of the sensing driver 220.

The data driver 210 receives the data control signal DCS1 from the driving controller 100. The data driver 210 converts the image data DATA into data signals (or data voltages) in response to the data control signal DCS1, and outputs the data signals to the plurality of data lines DL1 to DLm. The data signals may be analog voltages corresponding to gray scale values of the image data DATA.

The sensing driver 220 receives the sensing control signal DCS2 from the driving controller 100. The sensing driver 220 may sense the display panel DP in response to the sensing control signal DCS2. The sensing driver 220 may sense characteristics of elements included in each pixel PX of the display panel DP from the plurality of sensing lines RL1 to RLm.

In an embodiment of the inventive concept, the source driver 200 may be formed in the form of at least one chip. In an embodiment, when the source driver 200 is formed as a single chip, the data driver 210 and the sensing driver 220 may be embedded in the chip, for example. In addition, when the source driver 200 is formed as a plurality of chips, the data driver 210 and the sensing driver 220 may be embedded in each of the plurality of chips.

A structure in which the data driver 210 and the sensing driver 220 are embedded in the source driver 200 is illustrated, but the inventive concept is not limited thereto. In an embodiment, the data driver 210 and the sensing driver 220 may be formed in the form of a separate chip, for example.

In an embodiment of the inventive concept, the source driver 200 may be disposed inside the driving chips DIC illustrated in FIG. 2.

The driving controller 100 may drive the sensing driver 220 in a period during which power is applied to the display device DD (i.e., a power-on period) or a period during which the power application ends (i.e., a power-off period). In an alternative embodiment, the driving controller 100 may drive the sensing driver 220 in a predetermined period (e.g., a blank period) during which the display device DD does not substantially display images during an operation period (i.e., a display period) in which the display device DD displays images.

Elements such as the light-emitting element ED or transistors included in the pixels PX may be deteriorated in proportion to a driving time, so that characteristics (e.g., a threshold voltage) may be degraded. To compensate for this, the sensing driver 220 may sense characteristics of an element included in at least one pixel among the pixels PX, and may feedback sensed sensing data SD to the driving controller 100. The driving controller 100 may compensate for the image data DATA to be written in the pixels PX based on the sensing data SD fed back from the sensing driver 220.

The scan driver 250 receives the scan control signal SCS from the driving controller 100. The scan driver 250 may output scan signals in response to the scan control signal SCS. The scan driver 250 may be formed in the form of a chip and disposed (e.g., mounted) on the display panel DP. In an alternative embodiment, the scan driver 250 may be embedded in the display panel DP. When the scan driver 250 is embedded in the display panel DP, the scan driver 250 may include transistors formed through the same process as that of the pixel circuit unit PXC.

The scan driver 250 may generate a plurality of driving scan signals and a plurality of sensing scan signals in response to the scan control signal SCS. The plurality of driving scan signals is applied to the driving scan lines SCL1 to SCLn, and the plurality of sensing scan signals is applied to the sensing scan lines SSL1 to SSLn.

Each of the plurality of pixels PX may receive a first driving voltage ELVDD and a second driving voltage ELVSS.

The voltage generator 300 generates voltages desired for the operation of the display panel DP. In an embodiment of the inventive concept, the voltage generator 300 generates the first driving voltage ELVDD and the second driving voltage ELVSS desired for the operation of the display panel DP. The first driving voltage ELVDD and the second driving voltage ELVSS may be provided to the display panel DP through a first driving voltage line VL1 and a second driving voltage line VL2, respectively.

The voltage generator 300 may further generate various voltages (e.g., a gamma reference voltage, a data driving voltage, a gate-on voltage, a gate-off voltage, etc.) desired for the operation of the source driver 200 and the scan driver 250, in addition to the first driving voltage ELVDD and the second driving voltage ELVSS.

Figure 4:
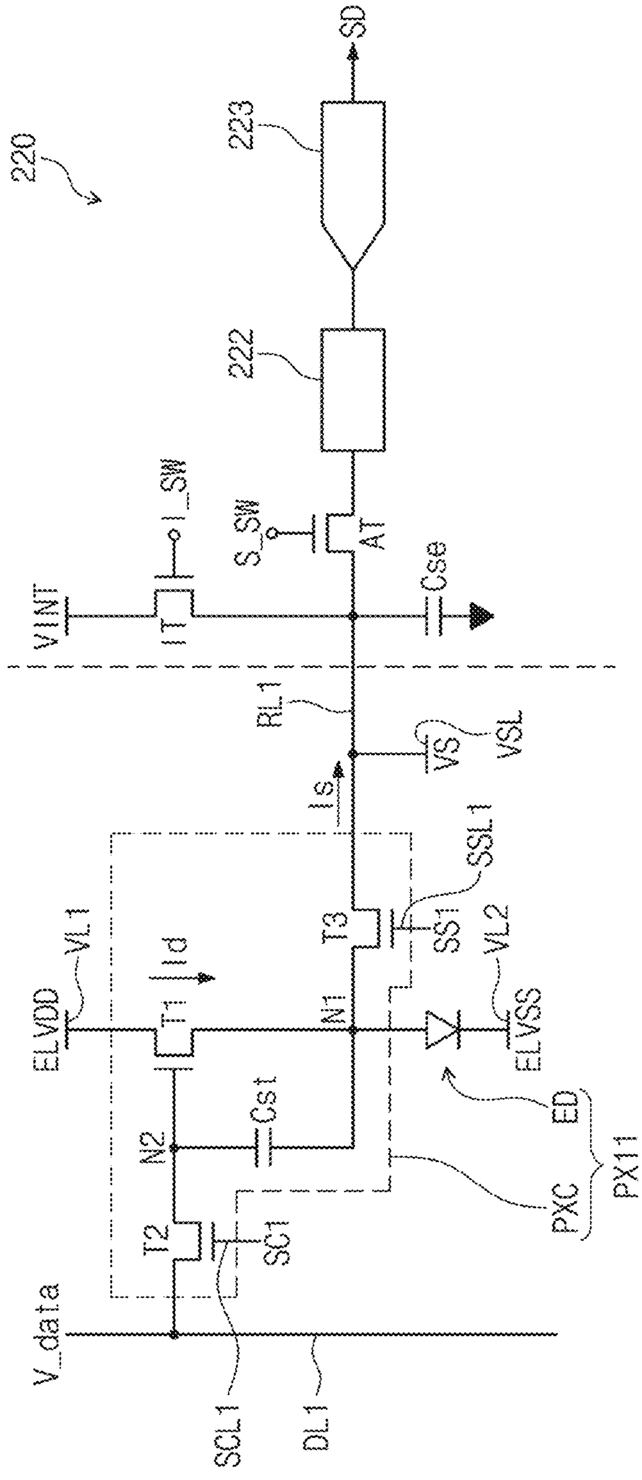
FIG. 4 is a circuit diagram showing an embodiment of a pixel and a sensing driver according to the inventive concept.

FIG. 4 is a circuit diagram showing an embodiment of a pixel and a sensing driver according to the inventive concept. FIG. 4 illustrates an equivalent circuit diagram of the first pixel PX11 among the plurality of pixels PX illustrated in FIG. 1. Each of the plurality of pixels PX has the same circuit structure, and thus, with the provision of a description of a circuit structure for the first pixel PX11, a detailed description of the rest of the pixels will be omitted.

Referring to FIG. 4, the first pixel PX11 is connected to the first data line DL1, the first driving scan line SCL1, the first sensing scan line SSL1, and the first sensing line RL1.

The first pixel PX11 includes the light-emitting element ED and the pixel circuit unit PXC. The light-emitting element ED may be a light-emitting diode. In an embodiment of the inventive concept, the light-emitting element ED may be an organic light-emitting diode including an organic light-emitting layer. The light-emitting element ED may be one of a red light-emitting element which outputs red light, a green light-emitting element which outputs green light, and a blue light-emitting element which outputs blue light.

The pixel circuit unit PXC includes first to third transistors T1, T2, and T3, and a capacitor Cst. At least one of the first to third transistors T1, T2 to T3 may be a transistor having a low-temperature polycrystalline silicon ("LTPS") semiconductor layer. Each of the first to third transistors T1, T2, and T3 may is an N-type transistor. However, the inventive concept is not limited thereto. Each of the first to third transistors T1, T2, and T3 may is P-type transistor. In an alternative embodiment, some of the first to third transistors T1, T2, and T3 may be N-type transistors, and the others thereof may be P-type transistors. In addition, at least one among of the first to third transistors T1, T2, and T3 may be a transistor including an oxide semiconductor layer.

The configuration of the pixel circuit unit PXC according to the inventive concept is not limited to the embodiment illustrated in FIG. 4. The pixel circuit unit PXC illustrated in FIG. 4 is only one of embodiments, and the configuration of the pixel circuit unit PXC may be modified and implemented. In an embodiment, the third transistor T3 may be omitted in the pixel circuit unit PXC, for example.

The first transistor T1 (or, may be also referred to as a driving transistor) is connected between the first driving voltage line VL1 which receives the first driving voltage ELVDD and the light-emitting element ED. The first transistor T1 includes a first electrode connected to the first driving voltage line VL1, a second electrode electrically connected to an anode of the light-emitting element ED, and a third electrode connected to one end of the capacitor Cst. Here, a contact point, to which the anode of the light-emitting element ED and the second electrode of the first transistor T1 are connected, may be also referred to as a first node N1. In the specification, "a transistor is connected to a signal line" means that "any one electrode among a first electrode, a second electrode, and a third electrode of the transistor has a shape of a single body with a signal line, or is connected thereto through a connection electrode." In addition, "a transistor is electrically connected to another transistor" means that "any one electrode among a first electrode, a second electrode, and a third electrode of the transistor has a shape of a single body with any one electrode among a first electrode, a second electrode, and a third electrode of the another transistor, or is connected thereto through a connection unit."

The first transistor T1 may receive a data voltage V_data transmitted by the first data line DL1 according to a switching operation of the second transistor T2 (or, may be also referred to as a switch transistor) to supply a driving current to the light-emitting element ED. The data voltage V_data transmitted by the first data line DL1 may be referred to differently according to a period. In an embodiment, the data voltage V_data transmitted to the first data line DL1 in a display period may be also referred to as a display data voltage, and the data voltage V_data transmitted to the first data line DL1 in a sensing period SP (refer to FIG. 7A) may be also referred to as a sensing data voltage, for example.

The second transistor T2 is connected between the first data line DL1 and the first electrode of the first transistor T1. The second transistor T2 includes a first electrode connected to the first data line DL1, a second electrode connected to the third electrode of the first transistor T1, and a third electrode connected to the first driving scan line SCL1. Here, a contact point, to which the second electrode of the second transistor T2 and the third electrode of the first transistor T1 are connected, may be also referred to as a second node N2. The second transistor T2 may be turned on according to a first driving scan signal SC1 received through the first driving scan line SCL1 and transmit the data voltage V_data transmitted from the first data line DL1 to the third electrode of the first transistor T1.

The third transistor T3 (or, may be also referred to as a sensing transistor) is connected between the second electrode of the first transistor T1 and the first sensing line RL1. The third transistor T3 includes a first electrode connected to the first node N1, a second electrode connected the first sensing line RL1, and a third electrode connected to the first sensing scan line SSL1. The third transistor T3 may be turned on according to a first sensing scan signal SS1 received through the first sensing scan line SSL1 and electrically connect the first sensing line RL1 and the first node N1.

One end of the capacitor Cst is connected to the second node N2, and the other end thereof is connected to the first node N1. A cathode of the light-emitting element ED may be connected to the second driving voltage line VL2 which transmits the second driving voltage ELVSS. The second driving voltage ELVSS may have a voltage level lower than that of the first driving voltage ELVDD.

The light-emitting element ED may include an anode connected to the second electrode of the first transistor T1 (or the first node N1) and the cathode which receives the second driving voltage ELVSS. The light-emitting element ED may generate light corresponding to an amount of current supplied from the first transistor T1.

The sensing driver 220 may be connected to the plurality of sensing lines RL1 to RLm (refer to FIG. 3A). The sensing driver 220 may receive sensing signals (or sensing voltages) from the plurality of sensing lines RL1 to RLm. The sensing driver 220 in an embodiment of the inventive concept may include initialization transistors IT, sampling transistors AT, a data acquisition circuit 222, and an analog-to-digital converter ("ADC") 223.

The initialization transistors IT may be electrically connected to the sensing lines RL1 to RLm. Although FIG. 4 illustrates only one initialization transistor IT connected to the first sensing line RL1, the sensing driver 220 may further include initialization transistors IT respectively connected to the rest of the sensing lines RL2 to RLm illustrated in FIG. 3A.

The initialization transistor IT may include a first electrode for receiving an initialization voltage VINT, a second electrode connected to the first sensing line RL1, and a third electrode for receiving an initialization control signal I_SW. The initialization transistor IT may initialize a potential of the first sensing line RL1 to the initialization voltage VINT in response to the initialization control signal I_SW during an initialization period. In an embodiment of the inventive concept, the initialization voltage VINT may be a ground voltage. In a period during which the initialization transistor IT is turned on simultaneously with the third transistor T3, the first node N1 may be initialized to the initialization voltage VINT.

Each of the sensing lines RL1 to RLm may be connected to a source voltage line VSL. A source voltage VS may be applied to the source voltage line VSL. Therefore, in a state in which the third transistor T3 and the initialization transistor IT are both turned off, each of the sensing lines RL1 to RLm may have a potential corresponding to the source voltage VS.

The sampling transistors AT may be electrically connected to the sensing lines RL1 to RLm. Although FIG. 4 illustrates only the sampling transistor AT connected to the first sensing line RL1, the sensing driver 220 may further include sampling transistors AT respectively connected to the rest of the sensing lines RL2 to RLm illustrated in FIG. 3A.

The sampling transistor AT may include a first electrode connected to the first sensing line RL1, a second electrode connected the data acquisition circuit 222, and a third electrode for receiving a sampling control signal S_SW. Here, the sampling transistor AT may sample a sensing signal (or a sensing voltage) output from the first sensing lines RL1 in response to the sampling control signal S_SW during a sampling period.

The sensing driver 220 may further include a sensing capacitor Cse connected to the sensing lines RL1 to RLm (e.g., the first sensing line RL1). One end of the sensing capacitor Cse may be connected to the sampling transistor AT, and the other end of the sensing capacitor Cse may be grounded.

During the sampling period, sensing signals respectively output from the sensing lines RL1 to RLm may be provided to the data acquisition circuit 222. The ADC 223 converts sensing signals output from the data acquisition circuit 222 into sensing data SD (refer to FIG. 3B) in a digital form and outputs the sensing data SD.

Figure 5A:
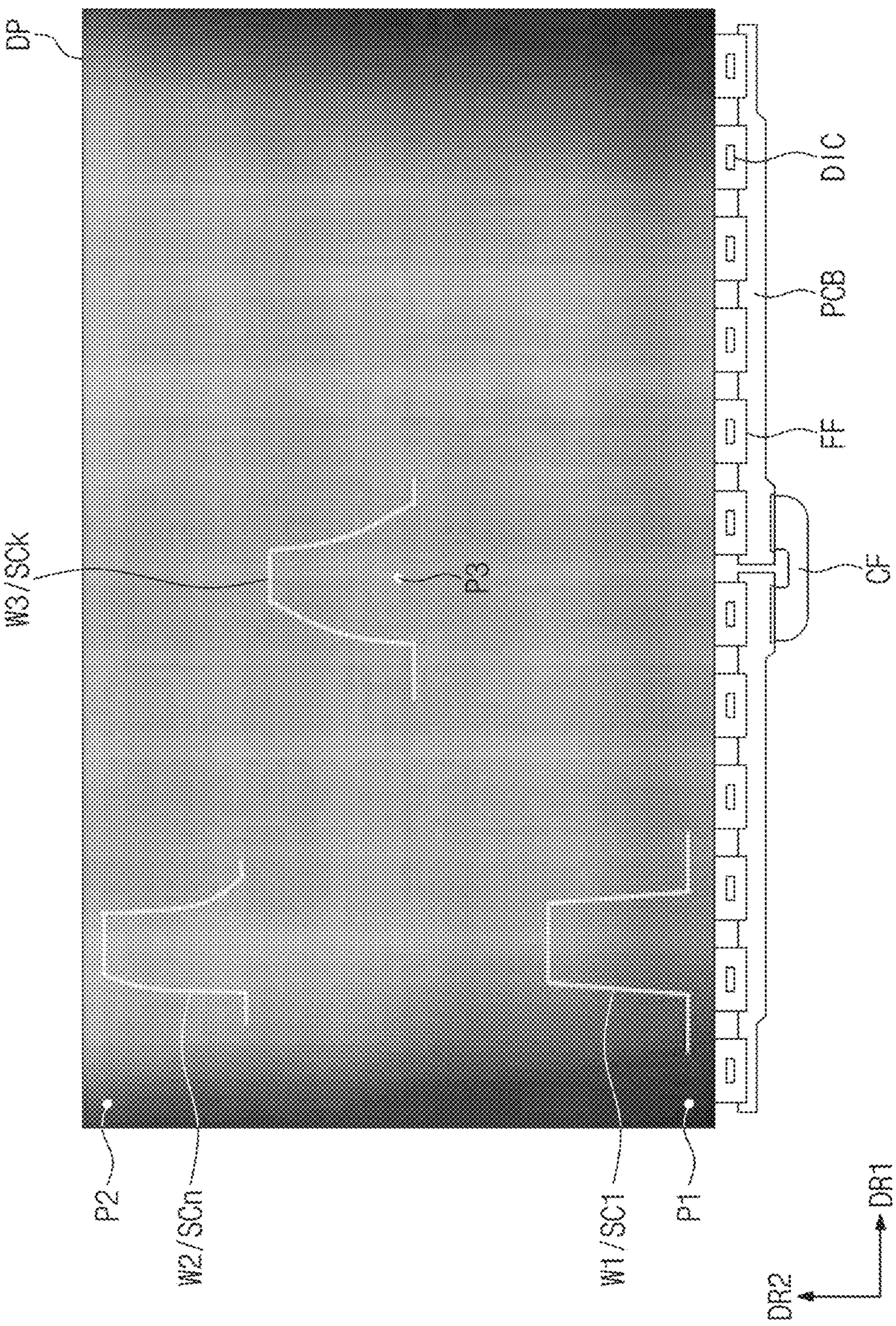
FIG. 5A is a plan view of an embodiment of a display device according to the inventive concept.
Figure 5B:
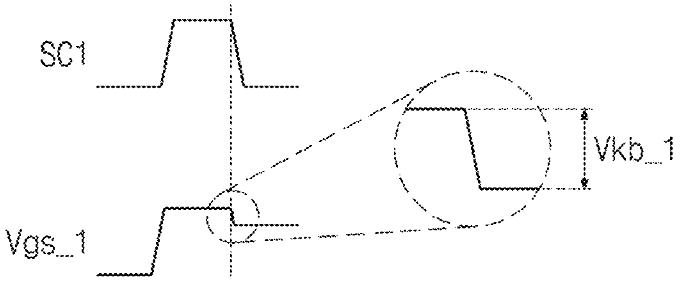
FIG. 5B is a waveform diagram showing a kickback voltage caused by a first driving scan signal illustrated in FIG. 5A.
Figure 5C:
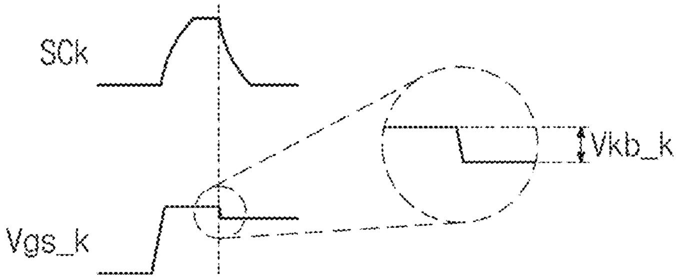
FIG. 5C is a waveform diagram showing a kickback voltage caused by a k-th driving scan signal illustrated in FIG. 5A.

FIG. 5A is a plan view of an embodiment of a display device according to the inventive concept, FIG. 5B is a waveform diagram showing a kickback voltage caused by a first driving scan signal illustrated in FIG. 5A, and FIG. 5C is a waveform diagram showing a kickback voltage caused by a k-th driving scan signal illustrated in FIG. 5A.

Referring to FIG. 3A and FIG. 5A, the scan driver 250 may include first and second scan drivers respectively disposed adjacent to opposite sides (hereinafter, a first side and a second side) of the display panel DP. The first and second sides are parallel to the second direction DR2, and may face each other in the first direction DR1. In this case, waveforms of driving scan signals supplied to the display panel DP are shown for each position.

In an embodiment of the inventive concept, in FIG. 5A, a first waveform W1 is obtained by measuring the first driving scan signal SC1, which is applied to the first driving scan line SCL1, at a position (i.e., a first position P1) adjacent to the first side, and a second waveform W2 is obtained by measuring an n-th driving scan signal SCn, which is applied to an n-th driving scan line SCLn, at a position (i.e., a second position P2) adjacent to the second side. A third waveform W3 is obtained by measuring a k-th driving scan signal SCk, which is applied to a k-th driving scan line, at a central portion (i.e., a third position P3) of the display panel DP. Here, k is an integer greater than 1 and less than n.

Since the first and second scan drivers are respectively disposed at the first and second sides, distortion of the driving scan signals SC1, SCk, and SCn caused by line resistance may become more severe from the first and second sides toward the center portion. In addition, the distortion of the driving scan signals SC1, SCk, and SCn caused by the line resistance may become more severe in a direction away from the circuit boards PCB (i.e., from the first driving scan line SCL1 toward the n-th driving scan line SCLn).

The level of the distortion of the driving scan signals SC1, SCk, and SCn may be represented by a deviation of a kickback voltage for each position in the display panel DP.

As illustrated in FIG. 5B and FIG. 5C, the kickback voltage may be generated by a phenomenon in which gate-source voltages Vgs_1 and Vgs_k of the first transistor T1 (refer to FIG. 4) are down due to capacitor coupling at a time point when the first and k-th driving scan signals SC1 and SCk transitions to a relatively low level. Here, the kickback voltage may be defined as a difference between a potential (i.e., a first potential) before the gate-source voltage Vgs_1 and Vgs_k are down and a potential (i.e., a second potential) after the down.

A kickback voltage at the first position P1 may be also referred to as a first kickback voltage Vkb_1, and a kickback voltage at the third position P3 may be also referred to as a second kickback voltage Vkb_k. The first driving scan signal SC1 measured at the first position P1 has less delay distortion than the k-th driving scan signal SCk measured at the third position P3. Therefore, at the first position P1, the first driving scan signal SC1 drops more sharply than the k-th driving scan signal SCk, so that an amount of change Vg of the potential (i.e., a gate voltage) of the third electrode of the first transistor T1 may be large. The k-th driving scan signal SCk drops gradually, so that the amount of change Vg of the gate voltage may be small. Accordingly, the magnitude of the second kickback voltage Vkb_k may be smaller than the magnitude of the first kickback voltage Vkb_1.

In addition, as shown in Equation 1, a kickback voltage Vkb in each pixel PX may vary depending on the size of a parasitic capacitor Cpara.

$$Vkb = \frac{Cpara}{Cpara + Cst} \times \Delta Vg \qquad \text{(Equation 1)}$$

Figure 6A:
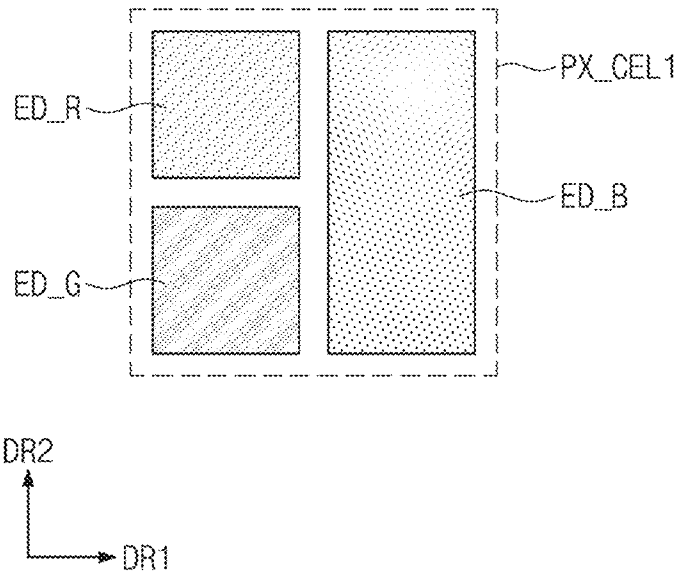
FIGS. 6A and FIG. 6B are plan views showing embodiments of layout structures of pixels according to the inventive concept.
Figure 6B:
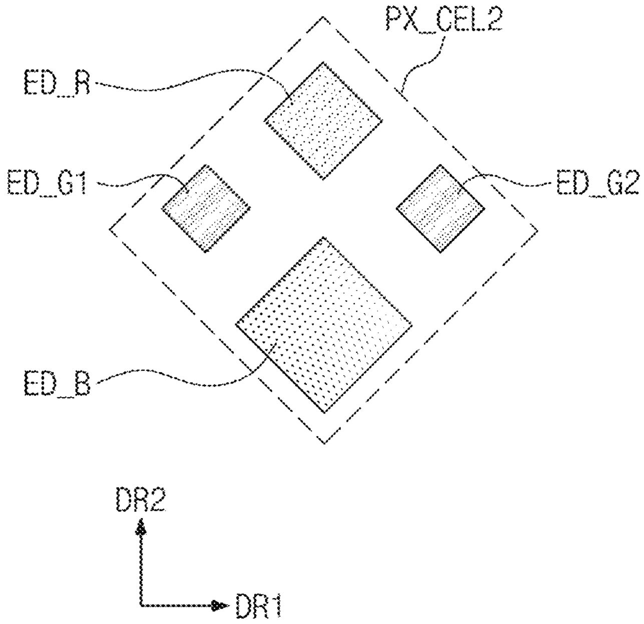

FIG. 6A and FIG. 6B are plan views showing embodiments of layout structures of pixels according to the inventive concept.

Referring to FIG. 6A, the display panel DP (refer to FIG. 3A) may include a plurality of pixel cells PX_CEL1 repeatedly arranged in the first and second directions DR1 and DR2. Each of the plurality of pixel cells PX_CEL1 includes a first pixel (or a red pixel), a second pixel (or a green pixel), and a third pixel (or a blue pixel).

The first pixel includes a first light-emitting element (or a red light-emitting element) ED_R which emits a first color light (or red light), the second pixel includes a second light-emitting element (or a green light-emitting element) ED_G which emits a second color light (or green light), and the third pixel includes a third light-emitting element (or a blue light-emitting element) ED_B which emits a third color light (or blue light). One of the first to third pixels may correspond to one of the pixels PX (refer to FIG. 3A).

In an embodiment of the inventive concept, the first light-emitting element ED_R and the second light-emitting element ED_G are arranged along the second direction DR2, and the third light-emitting element ED_B is disposed at a position adjacent to each of the first light-emitting element ED_R and the second light-emitting element ED_G in the first direction DR1. In an alternative embodiment, the first light-emitting element ED_R and the second light-emitting element ED_G may be arranged in a direction inclined with respect to the second direction DR2. In addition, when viewed in the first direction DR1, the third light-emitting element ED_B may be disposed to overlap each of the first light-emitting element ED_R and the second light-emitting element ED_G.

As illustrated in FIG. 6B, the first to third light-emitting elements ED_R, ED_G1, ED_G2, and EDB may be arranged in a PENTILE™ form. Specifically, one first light-emitting element ED_R, two second light-emitting elements ED_G1 and ED_G2, and one third light-emitting element EDB may form one pixel cell PX_CEL2. Each of the first to third light-emitting elements ED_R, ED_G1, ED_G2, and EDB may have a rhombus shape. In an embodiment, the area of the second light-emitting elements ED_G1 and ED_G2 may be smaller than that of the first and third light-emitting elements ED_R and ED_B, but the inventive concept is not limited thereto.

As described above, when the first to third light-emitting elements ED_R, ED_G1, ED_G2, and ED_B are not provided in the same shape and the same size, the size of the parasitic capacitor Cpara varies for each of the red, green, and blue pixels. The difference in size of the parasitic capacitor Cpara may be represented by a difference in kickback voltages R_Vkb, G_Vkb, and B_Vkb (refer to FIG. 7B) for each of the red, green, and blue pixels according to Equation 1.

Figure 7A:
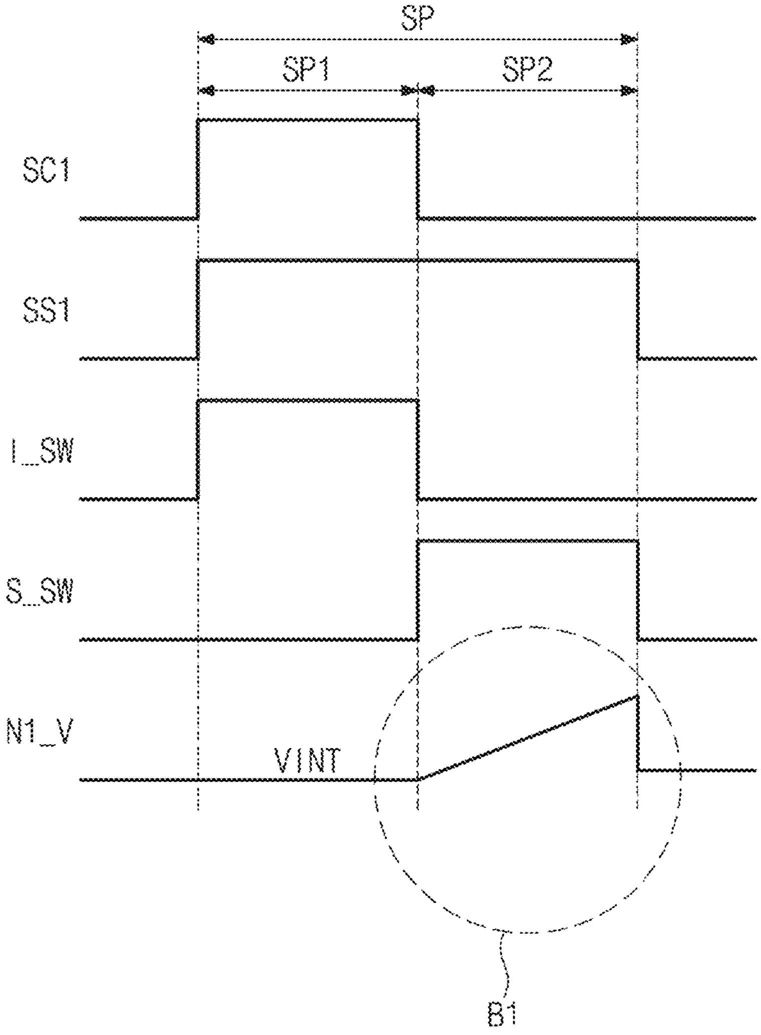
FIG. 7A is a waveform diagram for describing an operation of the pixel illustrated in FIG. 4 and a sensing period.
Figure 7B:
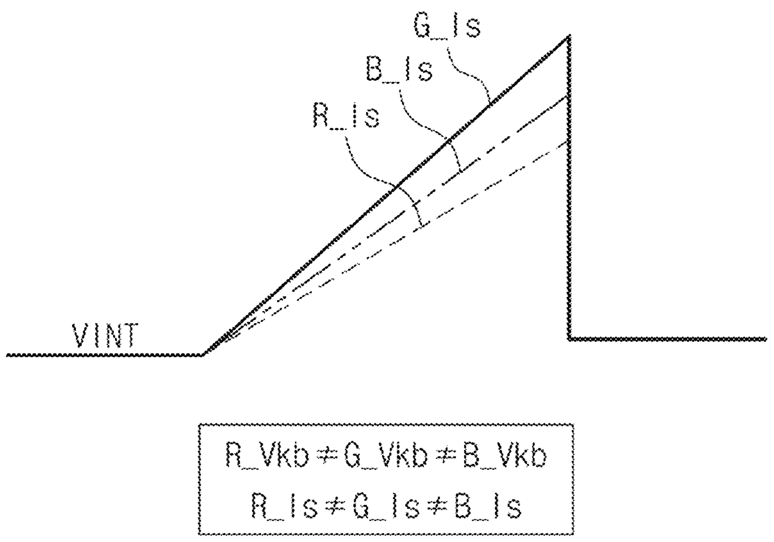
FIG. 7B is an enlarged waveform diagram of portion B1 illustrated in FIG. 7A.

FIG. 7A is a waveform diagram for describing an operation of the pixel illustrated in FIG. 4 and a sensing period, and FIG. 7B is a waveform diagram of enlarged portion B1 illustrated in FIG. 7A.

Referring to FIG. 4 and FIG. 7A, the first driving scan signal SC1 may be applied to the first driving scan line SCL1 during the sensing period SP, and the first sensing scan signal SS1 may be applied to the first sensing scan line SSL1. The duration of the sensing period SP may be greater than the duration of an activation period of at least one sensing scan signal (e.g., the first sensing scan signal SS1) among the sensing scan signals. An activation period of the first driving scan signal SC1 may overlap the activation period of the first sensing scan signal SS1. In an embodiment of the inventive concept, the activation period of the first sensing scan signal SS1 may have a duration (e.g., two times) greater than the activation period of the first driving scan signal SC1. In an embodiment of the inventive concept, an activation section may be defined as a relatively high level period.

The sensing period SP may include a write period SP1 in which the first driving scan signal SC1 and the first sensing scan signal SS1 are simultaneously activated, and include a readout period SP2 in which only the first sensing scan signal SS1 is activated.

During the write period SP1, the second transistor T2 may be turned on in response to the first driving scan signal SC1, and the third transistor T3 may be turned on in response to the first sensing scan signal SS1.

The sensing data voltage V_data may be applied to the second node N2 (i.e., the third electrode of the first transistor T1) through the first data line DL1 and the turned-on second transistor T2. The sensing data voltage V_data is a voltage applied to the data lines DL1 to DLm in the sensing period SP, and may be a data voltage set for the purpose of current sensing. An initialization voltage VINT may be applied to the first node N1 (i.e., the second electrode of the first transistor T1 or the anode of the light-emitting element ED) through the first sensing line RL1 and the turned-on third transistor T3. The initialization voltage VINT may be a voltage for initializing the first node N1.

A voltage between the first node N1 and the second node N2 may be set as a difference between the sensing data voltage V_data and the initialization voltage VINT. A charge corresponding to the difference between the sensing data voltage V_data and the initialization voltage VINT may be charged in the capacitor Cst. The voltage between the first node N1 and the second node N2 may be defined as a voltage between gate-source of the first transistor T1.

Thereafter, when the write period SP1 is terminated and the first driving scan signal SC1 is deactivated, the second transistor T2 may be turned off. Even when the second transistor T2 is turned off, a voltage between the first node N1 and the second node N2 may be maintained by the capacitor Cst during the readout period SP2.

Since the voltage between the first node N1 and the second node N2 is greater than a threshold voltage of the first transistor T1, a current (hereinafter, a drain current Id) may flow in the first transistor T1 during the readout period SP2. By the drain current Id, during the readout period SP2, a potential N1_V of the first node N1 may be boosted while maintaining the voltage between the first node N1 and the second node N2. During the readout period SP2, the drain current Id may be output to the first sensing line RL1 through the turned-on third transistor T3. A current output to the first sensing line RL1 may be also referred to as a sensing current Is. The magnitude of the sensing current Is may vary depending on the mobility of the first transistor T1. That is, the sensing current Is may have a value corresponding to the mobility of the first transistor T1. The sensing driver 220 (refer to FIG. 3B) receives the sensing current Is (refer to FIG. 4) through the first sensing line RL1, and may convert the sensing current Is into the sensing data SD (refer to FIG. 3B) to provide the sensing data SD to the driving controller 100 (refer to FIG. 3B).

As illustrated in FIG. 7B, when the size of the parasitic capacitor Cpara varies for each of the red, green, and blue pixels, there may be a difference in the kickback voltages R_Vkb, G_Vkb, and B_Vkb for each of the red, green, and blue pixels. The difference in the kickback voltages R_Vkb, G_Vkb, B_Vkb may lead to a difference in the sensing current Is output through the first sensing line RL1. That is, there may be a difference in sensing currents R_Is, G_Is, and B_Is for each of the red, green, and blue pixels. A sensing current output from the red pixel may be also referred to as a red sensing current R_Is (or a first pixel sensing signal), a sensing current output from the green pixel may be also referred to as a green sensing current G_Is (or a second pixel sensing signal), and a sensing current output from the blue pixel may be also referred to as a blue sensing current B_Is (or a third pixel sensing signal). Due to the difference in the kickback voltages R_Vkb, G_Vkb, and B_Vkb, the red, green, and blue sensing currents R_Is, G_Is, and B_Is may have different magnitudes from each other.

Figure 8:
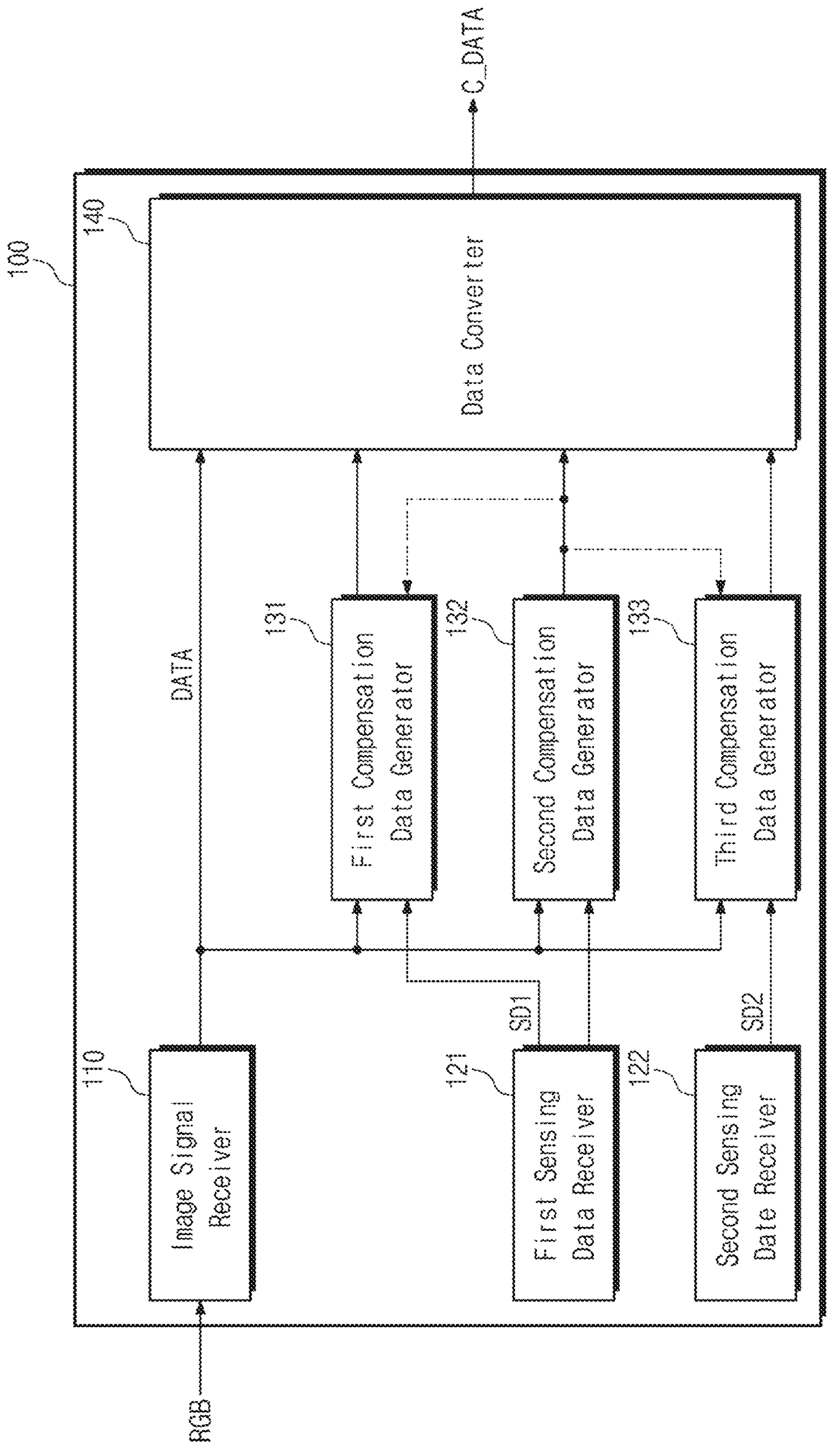
FIG. 8 is an internal block diagram of an embodiment of a driving controller according to the inventive concept.

FIG. 8 is an internal block diagram of an embodiment of a driving controller according to the inventive concept.

Referring to FIG. 8, the driving controller 100 in an embodiment of the inventive concept includes an image signal receiver 110, a first compensation data generator 131, a second compensation data generator 132, and a data converter 140.

The image signal receiver 1110 receives the input image signal RGB from the main controller, and may convert the data format of the input image signal RGB to generate the image data DATA.

The first compensation data generator 131 may generate mobility compensation data based on first sensing data SD1. The second compensation data generator 132 may generate kickback compensation data based on the first sensing data SD1. The driving controller 100 may further include a first sensing data receiver 121 which receives the first sensing data SD1. Each of the first and second compensation data generators 131 and 132 may receive the first sensing data SD1 from the first sensing data receiver 121.

The data converter 140 receives the image data DATA from the image signal receiver 110, and may receive the mobility compensation data and the kickback compensation data from the first and second compensation data generators 131 and 132, respectively. The data converter 140 may convert the image data DATA into compensation image data C_DATA by the mobility compensation data and the kickback compensation data.

The image data DATA output from the image signal receiver 110 may be further supplied to the first compensation data generator 131 and the second compensation data generator 132. The image data DATA supplied to the first and second compensation data generators 131 and 132 may be used to generate the mobility compensation data and the kickback compensation data, respectively.

In an embodiment of the inventive concept, the kickback compensation data generated from the second compensation data generator 132 may be applied to the first compensation data generator 131. In this case, the first compensation data generator 131 may refer to the kickback compensation data when generating the mobility compensation data.

The driving controller 100 may further include a second sensing data receiver 122 and a third compensation data generator 133. The third compensation data generator 133 may generate threshold voltage compensation data based on second sensing data SD2. The second sensing data receiver 122 receives the second sensing data SD2 from the sensing driver 220, and may provide the received second sensing data SD2 to the third compensation data generator 133.

In this case, the data converter 140 may further receive the threshold voltage compensation data from the third compensation data generator 133, and may further use the threshold voltage compensation data when converting the image data DATA into the compensation image data C_DATA.

The image data DATA output from the image signal receiver 110 may be further supplied to the third compensation data generator 133. The image data DATA supplied to the third compensation data generator 133 may be used to generate the threshold voltage compensation data.

In an embodiment of the inventive concept, the kickback compensation data generated from the second compensation data generator 132 may be applied to the third compensation data generator 133. In this case, the third compensation data generator 133 may refer to the kickback compensation data when generating the threshold voltage compensation data.

Figure 9:
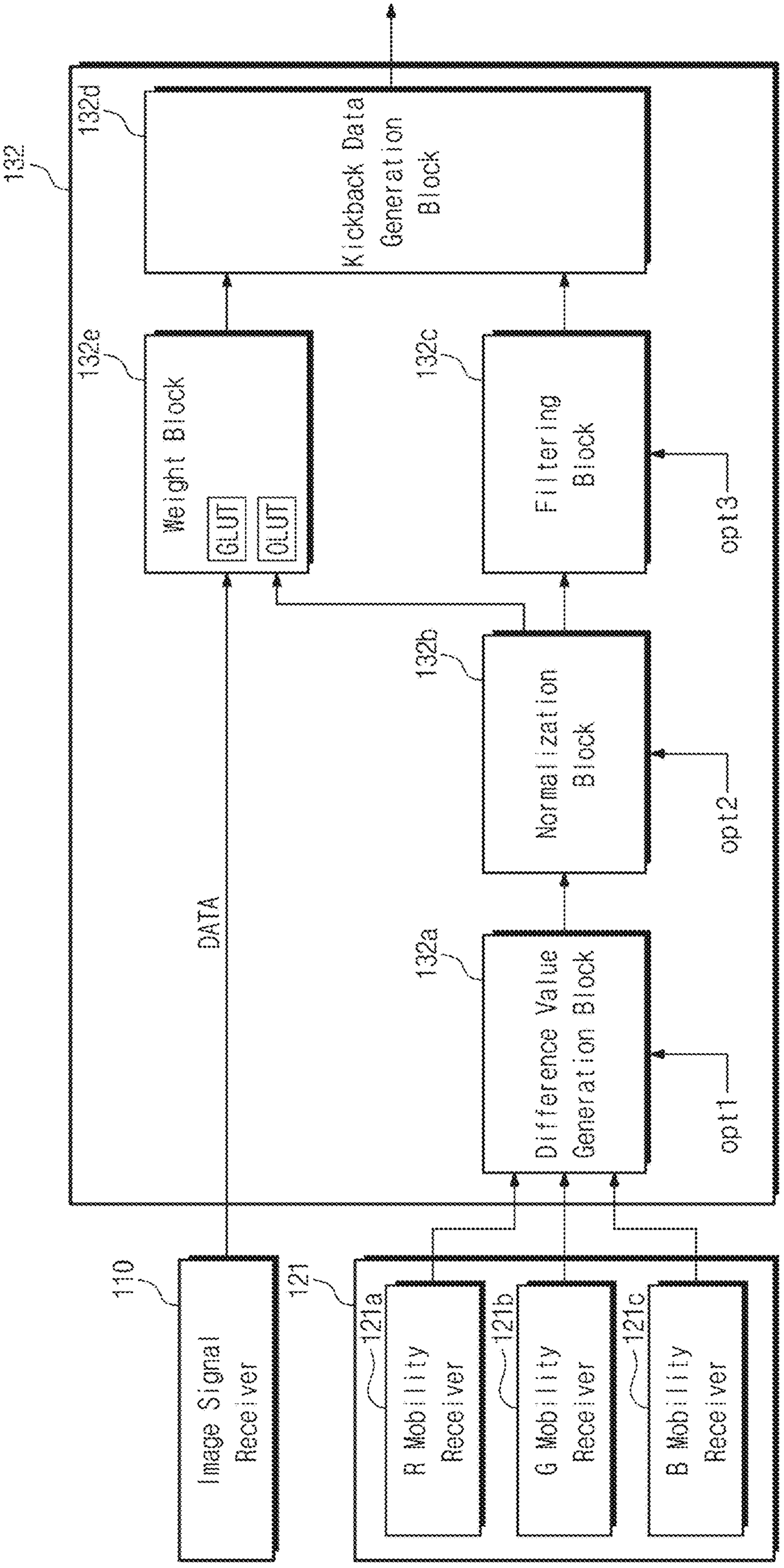
FIG. 9 is an internal block diagram of a second compensation data generator illustrated in FIG. 8.
Figure 10A:
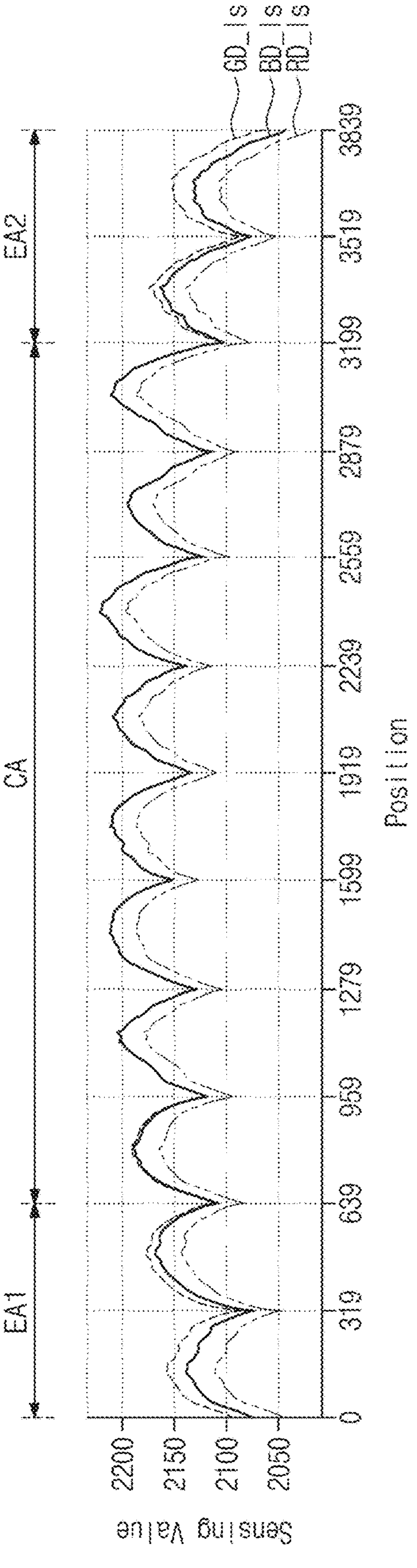
FIG. 10A is a waveform diagram showing mobility sensing data for each of red, green, and blue pixels according to positions in a display panel.
Figure 10B:
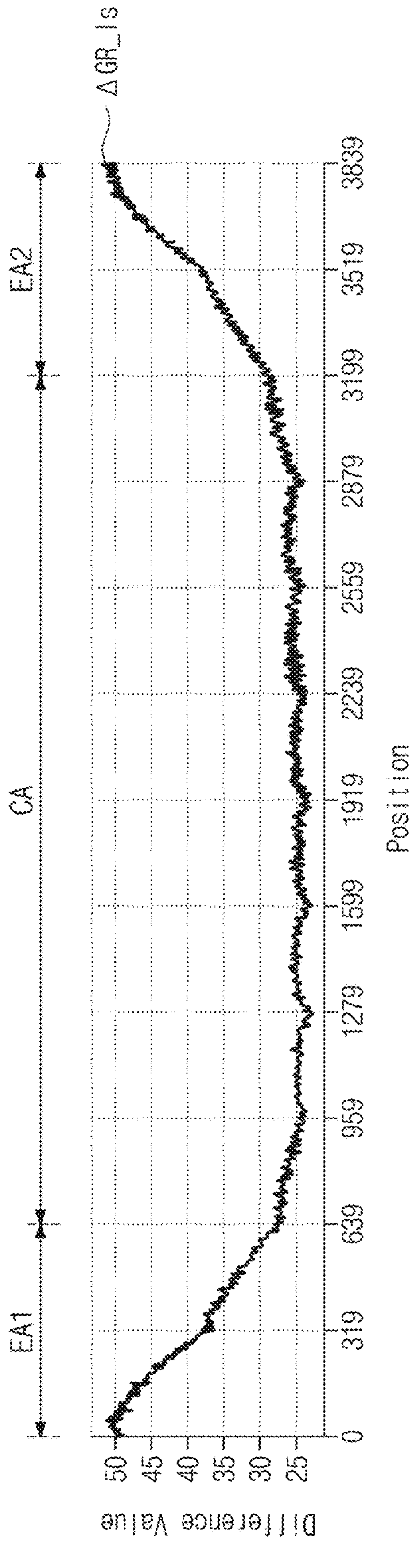
FIG. 10B is a waveform diagram showing an embodiment of deviations between second mobility sensing data and first mobility sensing data according to positions in a display panel according to the inventive concept.
Figure 10C:
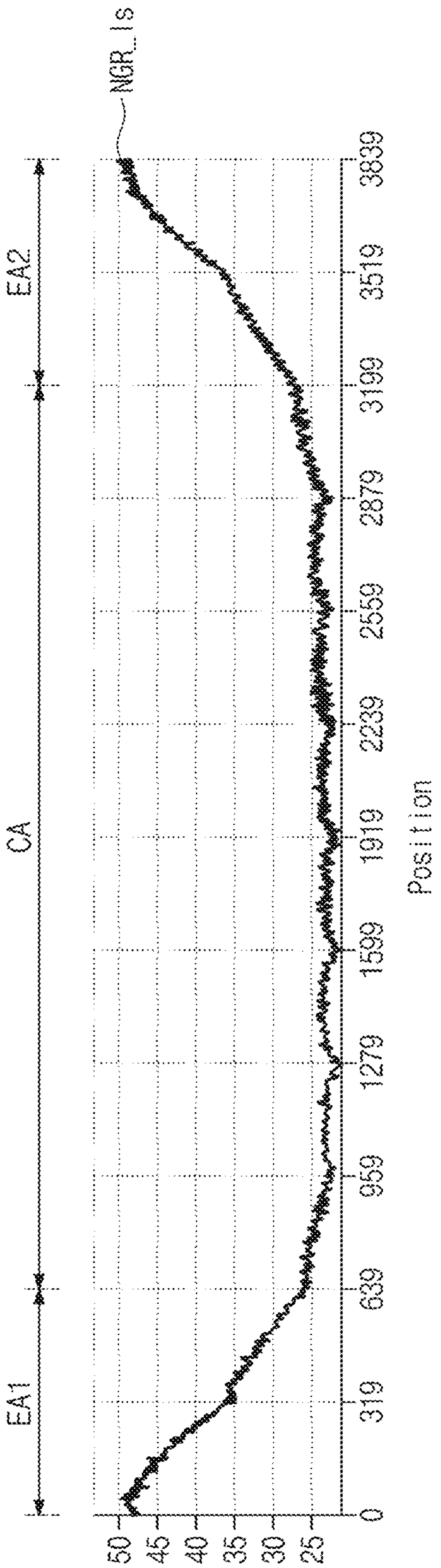
FIG. 10C is a waveform diagram showing an embodiment of green-red normalization difference values according to positions in a display panel according to the inventive concept.
Figure 10D:
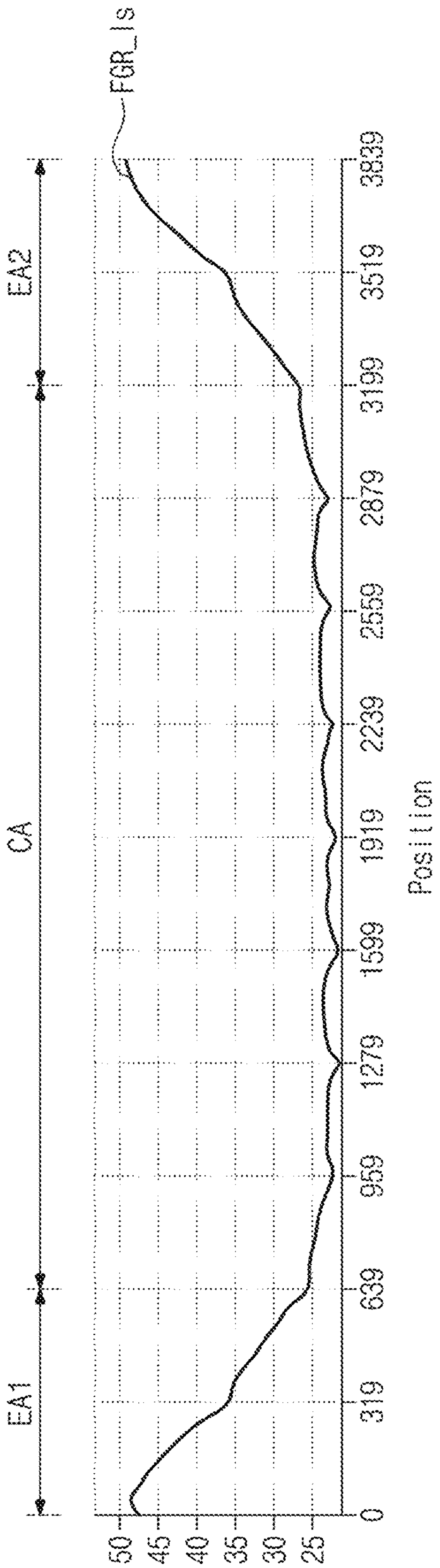
FIG. 10D is a waveform diagram showing an embodiment of green-red filtering values according to positions in a display panel according to the inventive concept.

FIG. 9 is an internal block diagram of a second compensation data generator illustrated in FIG. 8. FIG. 10A is a waveform diagram showing a difference in sensing current for each of red, green, and blue pixels according to a position. FIG. 10B is a waveform diagram showing a difference between a green sensing current and a red sensing current according to a position. FIG. 10C is a waveform diagram showing a difference in normalized green-red sensing current according to a position. FIG. 10D is a waveform diagram showing a difference in filtered green-red sensing current according to a position.

Referring to FIG. 9, the second compensation data generator 132 includes a difference value generation block 132*a*, a normalization block 132*b*, a filtering block 132*c*, and a kickback data generation block 132*d*. In an embodiment of the inventive concept, the first sensing data receiver 121 includes a first mobility receiver (or, an R mobility receiver) 121*a*, a second mobility receiver (or, a G mobility receiver) 121*b*, and a third mobility receiver (or a B mobility receiver 121*c*).

In an embodiment of the inventive concept, each of the plurality of pixel cells PX_CEL1 (refer to FIG. 6A) may include a plurality of first pixels (i.e., red pixels) which outputs a first color light (i.e., red light), a plurality of second pixels (i.e., green pixels) which outputs second color light (i.e., green light), and a plurality of third pixels (i.e., blue pixels) which outputs third color light (i.e., blue light). In this case, the R mobility receiver 121*a* receives first pixel sensing data RD_Is corresponding to the plurality of red pixels from the sensing driver 220 (refer to FIG. 3B), and the G mobility receiver 121*b* receives second pixel sensing data GD_Is corresponding to the plurality of green pixels from the sensing driver 220. The B mobility receiver 121*c* receives third pixel sensing data BD_Is corresponding to the plurality of blue pixels from the sensing driver 220. When the plurality of pixels further includes a plurality of fourth pixels, the first sensing data receiver 121 may further include a fourth mobility receiver which receives fourth pixel sensing data corresponding to the plurality of fourth pixels.

The first pixel sensing data RD_Is is first mobility sensing data including information about the mobility of the first transistor T1 (refer to FIG. 4) provided in a corresponding red pixel, and the second pixel sensing data GD_Is is second mobility sensing data including information about the mobility of the first transistor T1 provided in a corresponding green pixel. The third pixel sensing data BD_Is is third mobility sensing data including information about the mobility of the first transistor T1 provided in a corresponding blue pixel.

The difference value generation block 132*a* may be activated by a first option signal opt1. When the difference value generation block 132*a* is activated by the first option signal opt1, the difference value generation block 132*a* may generate first to third sensing difference values based on a difference among the first to third pixel sensing data RD_Is, GD_Is, and BD_Is. In an embodiment of the inventive concept, the difference value generation block 132*a* may generate the first sensing difference value (or a green-red sensing difference value ΔGR_Is) based on a difference between the first and second pixel sensing data RD_Is and GD_Is, may generate the second sensing difference value (or, a green-blue sensing difference value) based on a difference between the second and third pixel sensing data GD_Is and BD_Is, and may generate the third sensing difference value (or, a blue-red sensing difference value) based on a difference between the third and first pixel sensing data BD_Is and RD_Is.

As illustrated in FIG. 10A, in a central portion CA of the display panel DP (refer to FIG. 5A), there is almost no difference in sensing values between the first and second pixel sensing data RD_Is and GD_Is. However, in first and second edge regions EA1 and EA2 of the display panel DP, there is a difference in sensing values between the first and second pixel sensing data RD_Is and GD_Is. In the first and second edge regions EA1 and EA2, the difference in the sensing values appearing between the first and second pixel sensing data RD_Is and GD_Is may be due to a deviation of kickback voltages between the red and green pixels. When the size of the parasitic capacitor Cpara varies for each of the red, green, and blue pixels, the magnitudes of the kickback voltages R_Vkb, G_Vkb, and B_Vkb may vary for each of the red, green, and blue pixels, and such variations may be represented as a difference in the sensing values among the first to third pixel sensing data RD_Is, GD_Is, and BD_Is.

Therefore, the first to third sensing difference values generated in the difference value generating block 132*a* may include deviation information about the kickback voltages R_Vkb, G_Vkb, and B_Vkb for each of the red, green, and blue pixels. That is, the first sensing difference value ΔGR_Is may include deviation information about a kickback voltage between the green and red pixels, the second sensing difference value may include deviation information about a kickback voltage between the green and blue pixels, and the third sensing difference value may include deviation information about a kickback voltage between the blue and red pixels.

As illustrated in FIG. 10B, the first sensing difference value ΔGR_Is shown to have a larger value in the first and second edge regions EA1 and EA2 than in the central portion CA. Although FIG. 10B illustrates only the first sensing difference value ΔGR_Is among the first to third sensing difference values, the second and third sensing difference values may also appear in a form similar to that of the first sensing difference value ΔGR_Is.

The normalization block 132*b* may be activated by a second option signal opt2. When the normalization block 132*b* is activated by the second option signal opt2, the normalization block 132*b* may normalize the first to third sensing difference values to generate first to third normalization difference values, respectively. In an embodiment of the inventive concept, the normalization block 132*b* may set the first to third sensing difference values generated corresponding to a predetermined region of the display panel DP to first to third offset values, respectively. Here, the predetermined region may be a region included in the central portion CA. Particularly, the predetermined region may be a region including a point at which the smallest value, among the first to third sensing difference values sensed in the central portion CA, is sensed.

In an embodiment of the inventive concept, the first offset value may be the smallest value among first sensing difference values generated corresponding to the predetermined region, the second offset value may be the smallest value among second sensing difference values generated corresponding to the predetermined region, and the third offset value may be the smallest value among third sensing difference values generated corresponding to the predetermined region. In an alternative embodiment, the first offset value may be an average value of the first sensing difference values generated corresponding to the predetermined region, the second offset value may be an average value of the second sensing difference values generated corresponding to the predetermined region, and the third offset value may be an average value of the third sensing difference values generated corresponding to the predetermined region.

The normalization block 132*b* may generate the first to third normalization difference values by subtracting the first to third offset values from the first to third sensing difference values, respectively. As illustrated in FIG. 10B, a first normalization difference value NGR_Is shown to have a larger value in the first and second edge regions EA1 and EA2 than in the central portion CA. Although FIG. 10C illustrates only the first normalization difference value NGR_Is among the first to third normalization difference values, the second and third normalization difference values may also appear in a form similar to that of the first normalization difference value NGR_Is.

The filtering block 132*c* may be activated by a third option signal opt3. When the filtering block 132*c* is activated by the third option signal opt3, the filtering block 132*c* may filter the first to third normalization difference values to generate first to third filtering values, respectively. As illustrated in FIG. 10D, a first filtering value FGR_Is shown to have a larger value in the first and second edge regions EA1 and EA2 than in the central portion CA. Although FIG. 10D illustrates only the first filtering value FGR_Is among the first to third filtering values, the second and third filtering values may also appear in a form similar to that of the first filtering value FGR_Is.

The first to third filtering values output from the filtering block 132*c* may be provided to the kickback data generation block 132*d*. The kickback data generation block 132*d* may generate the kickback compensation data based on the first to third filtering values.

The second compensation data generator 132 may further include a weight block 132*e*. The weight block 132*e* may receive the image data DATA from the image signal receiver 110, and may receive the first to third offset values from the normalization block 132*b*. The weight block 132*e* may include first and second look-up tables GLUT and OLUT. The first look-up table GLUT may store weights according to a gray scale size, and the second look-up table OLUT may store weights according to the size of the first to third offset values.

The weight block 132*e* may select a weight corresponding to a gray scale of the image data DATA from the first look-up table GLUT, and may select a weight corresponding to the first to third offset values from the second look-up table OLUT. The selected weights are provided to the kickback data generation block 132*d*, and the kickback data generation block 132*d* may generate the kickback compensation data based on the selected weights and the first to third filtering values.

As described above, the overall luminance uniformity of the display device DD (refer to FIG. 3A) may be improved by compensating for a deviation of a kickback voltage among pixels based on mobility sensing data sensed from the pixels.

Figure 11:
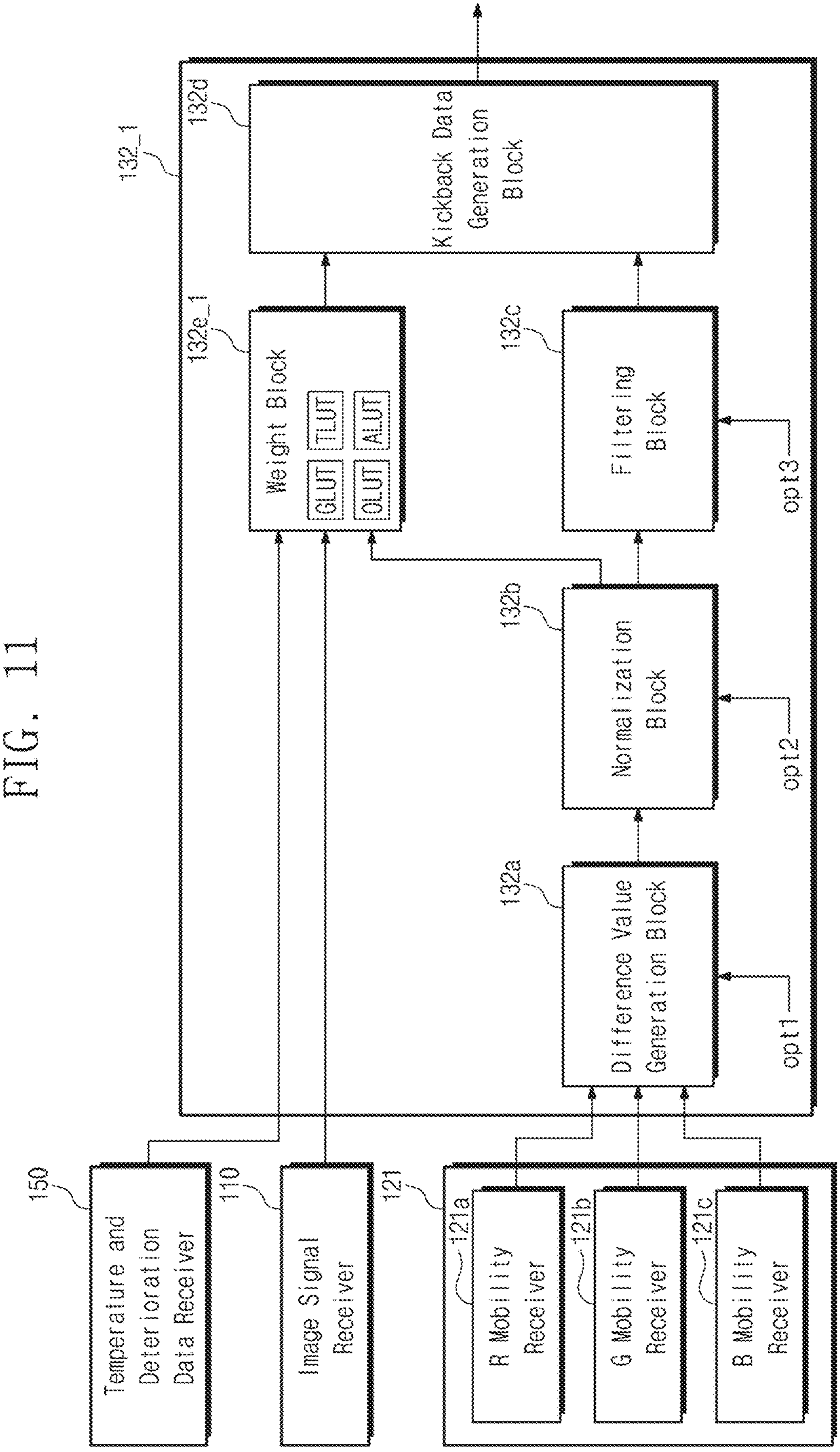
FIG. 11 is an internal block diagram of an embodiment of a second compensation data generator according to the inventive concept.

FIG. 11 is an internal block diagram of an embodiment of a second compensation data generator according to the inventive concept. Among the components illustrated in FIG. 11, the same components as those illustrated in FIG. 9 are denoted by the same reference numerals, and detailed descriptions thereof are omitted.

Referring to FIG. 11, a second compensation data generator 132_1 in an embodiment of the inventive concept includes a difference value generation block 132*a*, a normalization block 132*b*, a filtering block 132*c*, and a kickback data generation block 132*d*, and a weight block 132*e*_1.

The weight block 132*e*_1 may receive the image data DATA from the image signal receiver 110, and may receive the first to third offset values from the normalization block 132*b*. The weight block 132*e*_1 may further receive temperature sensing data and deterioration sensing data from a temperature and deterioration data receiver 150. The temperature and deterioration data receiver 150 may be a component included in the driving controller 110 (refer to FIG. 9).

The weight block 132*e*_1 may further include third and fourth look-up tables TLUT and ALUT in addition to first and second look-up tables GLUT and OLUT. The third look-up table TLUT may store weights according to the size of the temperature sensing data, and the fourth look-up table ALUT may store weights according to the size of the deterioration sensing data.

The weight block 132*e*_1 may select a weight corresponding to the temperature and deterioration sensing data, which is received from the temperature and deterioration data receiver 150, from the third and fourth look-up tables TLUT and ALUT. The selected weights are provided to the kickback data generation block 132*d*, and the kickback data generation block 132*d* may generate the kickback compensation data based on the selected weights and the first to third filtering values.

The weight block 132*e*_1 may include a look-up table for variables affecting a kickback voltage. Although FIG. 9 and FIG. 11 illustrate only the look-up tables GLUT, OLUT, TLUT, and ALUT for the gray scale, temperature, deterioration level, and offset values of the image data DATA, a look-up table for other variables affecting the kickback voltage may be further added to the weight block 132*e*_1.

Figure 12:
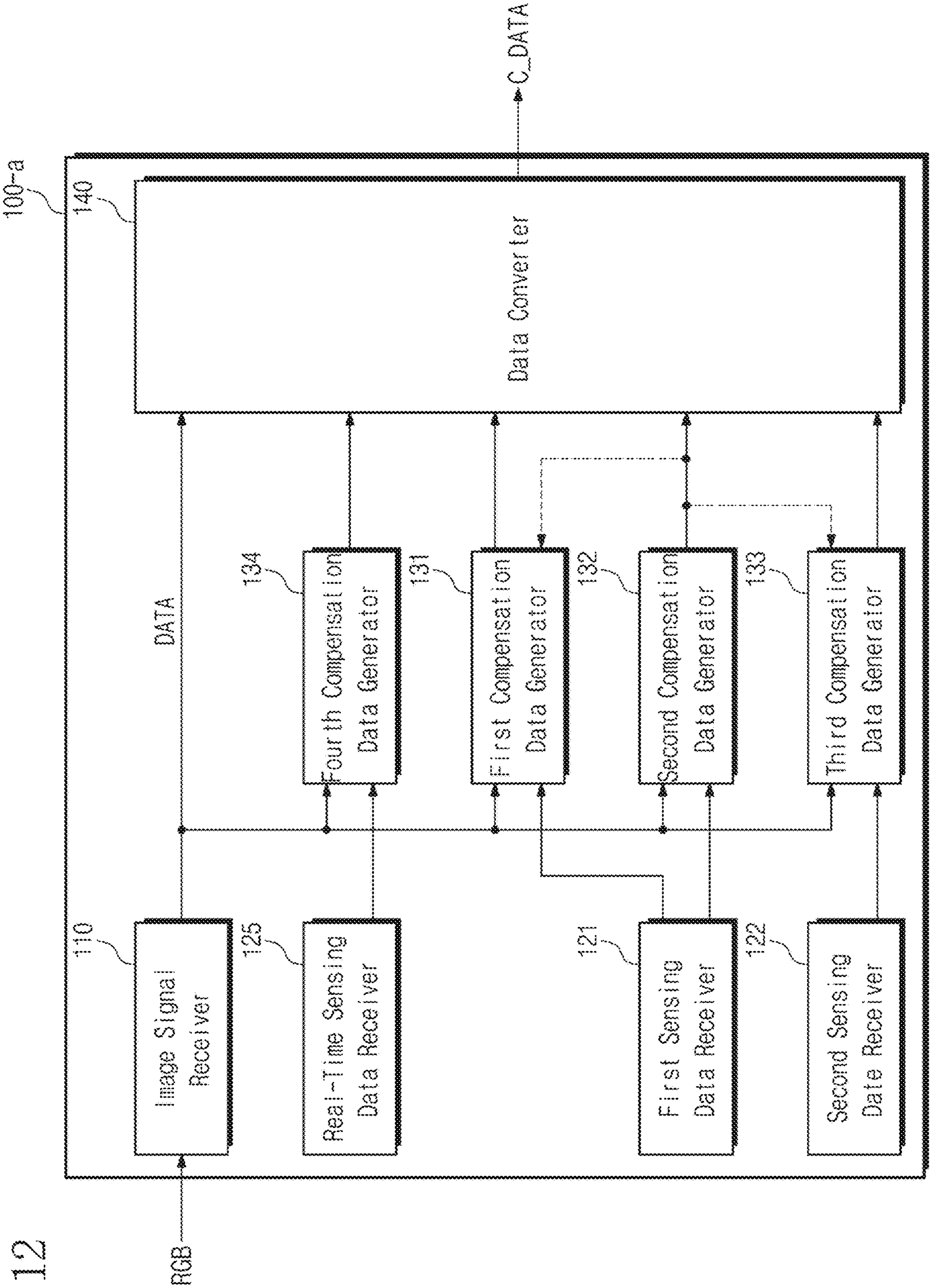
FIG. 12 is an internal block diagram of an embodiment of a driving controller according to the inventive concept.

FIG. 12 is an internal block diagram of an embodiment of a driving controller according to the inventive concept. Among the components illustrated in FIG. 12, the same components as those illustrated in FIG. 8 are denoted by the same reference numerals, and detailed descriptions thereof are omitted.

Referring to FIG. 12, a driving controller 100-*a* in an embodiment of the inventive concept may further include a real-time sensing data receiver 125 and a fourth compensation data generator 134.

The real-time sensing data receiver 125 may receive, from the sensing driver 220, real-time sensing data sensed in a predetermined period, (e.g., a blank period) in which the display device DD (refer to FIG. 3A) does not substantially display an image, in an operation period (i.e., a display period) in which the display device DD displays an image. In this case, the first and second sensing data receivers 121 and 122 may not receive the first and second sensing data during the display period, and may receive the first and second sensing data only during the power-on period or the power-off period of the display device DD.

The fourth compensation data generator 134 receives the real-time sensing data from the real-time sensing data receiver 125, and may generate real-time compensation data based on the received real-time sensing data. The real-time compensation data may be provided to the data converter 140.

The data converter 140 may further receive the real-time compensation data from the fourth compensation data generator 134, and may further use the real-time compensation data when converting the image data DATA into the compensation image data C_DATA.

According to the invention, the overall luminance uniformity of a display device may be improved by compensating for a deviation of a kickback voltage among pixels based on mobility sensing data sensed from the pixels.

Although the invention has been described with reference to preferred embodiments of the invention, it will be understood by those skilled in the art that various modifications and changes in form and details may be made therein without departing from the spirit and scope of the invention as set forth in the following claims. Accordingly, the technical scope of the inventive concept is not intended to be limited to the contents set forth in the detailed description of the specification, but is intended to be defined by the appended claims.

What is claimed is:

1. A display device comprising:

a display panel including a pixel including a driving transistor and a light-emitting element, and a sensing line connected to the pixel;

a sensing driver which senses a first sensing signal corresponding to mobility of the driving transistor through the sensing line during a sensing period, processes the first sensing signal and outputs first sensing data;

a driving controller which receives the first sensing data from the sensing driver, generates mobility compensation data and kickback compensation data which compensates a kickback voltage generated by a gate-source voltage of the driving transistor based on the first sensing data, and converts image data into compensation image data by the mobility compensation data and the kickback compensation data; and a data driver which converts the compensation image data into a data signal and provides the data signal to the pixel.

2. The display device of claim 1, wherein the driving controller comprises:

a first compensation data generator which generates the mobility compensation data based on the first sensing data;

a second compensation data generator which generates the kickback compensation data based on the first sensing data; and a data converter which converts the image data into the compensation image data by the mobility compensation data and the kickback compensation data.

3. The display device of claim 2, wherein the pixel is provided in plural, wherein a plurality of pixels includes a first pixel which outputs a first color light, a second pixel which outputs a second color light, and a third pixel which outputs a third color light, wherein the first sensing signal includes a first pixel sensing signal sensed from the first pixel, a second pixel sensing signal sensed from the second pixel, and a third pixel sensing signal sensed from the third pixel.

4. The display device of claim 3, wherein the first to third color lights have different colors from each other.

5. The display device of claim 3, wherein the second compensation data generator receives first pixel sensing data generated from the first pixel sensing signal, second pixel sensing data generated from the second pixel sensing signal, and third pixel sensing data generated from the third pixel sensing signal, and generate the kickback compensation data by a difference among the first to third pixel sensing data.

6. The display device of claim 5, wherein the second compensation data generator comprises a difference value generation block which generates a first sensing difference value based on a difference between the first and second pixel sensing data, generates a second sensing difference value based on a difference between the second and third pixel sensing data, and generates a third sensing difference value based on a difference between the third and first pixel sensing data.

7. The display device of claim 6, wherein the second compensation data generator further comprises a normalization block which generates first to third normalization difference values by normalizing the first to third sensing difference values, respectively.

8. The display device of claim 7, wherein the normalization block which:

sets first to third offset values based on the first to third sensing difference values generated corresponding to a predetermined region of the display panel; and generates the first to third normalization difference values by subtracting the first to third offset values from the first to third sensing difference values, respectively.

9. The display device of claim 8, wherein the predetermined region is a region including a point at which a size of the first to third sensing difference values has a smallest value in the display panel.

10. The display device of claim 7, wherein the second compensation data generator further comprises a filtering block which generates first to third filtering values by filtering the first to third normalization difference values, respectively.

11. The display device of claim 2, wherein the data converter receives the mobility compensation data and the kickback compensation data from the first and second compensation data generators, respectively.

12. The display device of claim 2, wherein:

the first compensation data generator generates the mobility compensation data based on the first sensing data and the kickback compensation data; and the data converter receives the mobility compensation data and the kickback compensation data from the first and second compensation data generators, respectively.

13. The display device of claim 2, wherein the sensing driver senses a second sensing signal corresponding to a threshold voltage of the driving transistor through the sensing line during the sensing period, processes the second sensing signal and outputs second sensing data.

14. The display device of claim 13, wherein the driving controller further comprises a third compensation data generator which receives the second sensing data from the sensing driver, and generates threshold voltage compensation data based on the second sensing data.

15. The display device of claim 14, wherein the data converter further uses the threshold voltage compensation data and converts the image data into the compensation image data.

16. The display device of claim 14, wherein:

the third compensation data generator generates the threshold voltage compensation data based on the second sensing data and the kickback compensation data; and the data converter receives the mobility compensation data, the kickback compensation data, and the threshold voltage compensation data from the first to third compensation data generators, respectively.

17. A display device comprising:

a display panel including a pixel cell and at least one sensing line connected to the pixel cell, wherein the pixel cell includes a first pixel, a second pixel, and a third pixel;

a sensing driver which is connected to the at least one sensing line, receives a first pixel sensing signal for the first pixel, a second pixel sensing signal for the second pixel, and a third pixel sensing signal for the third pixel, processes the first to third pixel sensing signals and outputs first, second, and third pixel sensing data;

a driving controller which receives the first, second, and third pixel sensing data from the sensing driver, generates kickback compensation data which compensates a kickback voltage generated by a gate-source voltage of the driving transistor by a difference among the first, second, and third pixel sensing data, and converts image data into compensation image data based on the kickback compensation data; and a data driver which converts the compensation image data into a data signal and provides the data signal to the display panel.

18. The display device of claim 17, wherein:

the first pixel comprises a first driving transistor and a first light-emitting element;

the second pixel comprises a second driving transistor and a second light-emitting element; and the third pixel comprises a third driving transistor and a third light-emitting element, wherein the first pixel sensing signal corresponds to mobility of the first driving transistor, the second pixel sensing signal corresponds to mobility of the second driving transistor, and the third pixel sensing signal corresponds to mobility of the third driving transistor.

19. The display device of claim 18, wherein:

the first light-emitting element outputs a first color light;

the second light-emitting element outputs a second color light; and the third light-emitting element outputs a third color light, wherein the first to third color lights have different colors from each other.

20. The display device of claim 17, wherein the driving controller comprises:

a compensation data generator which generates the kickback compensation data; and a data converter which converts the image data into the compensation image data by the kickback compensation data.

21. The display device of claim 20, wherein the compensation data generator receives first pixel sensing data generated from the first pixel sensing signal, second pixel sensing data generated from the second pixel sensing signal, and third pixel sensing data generated from the third pixel sensing signal, and generates the kickback compensation data by a difference among the first to third pixel sensing data.

22. The display device of claim 21, wherein the compensation data generator comprises a difference value generation block which generates a first sensing difference value based on a difference between the first and second pixel sensing data, generate a second sensing difference value based on a difference between the second and third pixel sensing data, and generates a third sensing difference value based on a difference between the third and first pixel sensing data.

23. The display device of claim 22, wherein the compensation data generator further comprises a normalization block which generates first to third normalization difference values by normalizing the first to third sensing difference values, respectively.

24. The display device of claim 23, wherein the normalization block which:

sets first to third offset values based on the first to third sensing difference values generated corresponding to a predetermined region of the display panel; and generates the first to third normalization difference values by subtracting the first to third offset values from the first to third sensing difference values, respectively.

25. The display device of claim 24, wherein the predetermined region is a region including a point at which a size of the first to third sensing difference values has a smallest value in the display panel.

26. The display device of claim 23, wherein the compensation data generator further comprises a filtering block which generates first to third filtering values by filtering the first to third normalization difference values, respectively.

* * * * *